(12) United States Patent
West et al.

(10) Patent No.: US 9,879,430 B2
(45) Date of Patent: Jan. 30, 2018

(54) REPLACEMENT FLASHING FOR EXHAUST GAS VENTS BENEATH ROOF-MOUNTED PHOTOVOLTAIC SYSTEMS

(71) Applicant: SolarCity Corporation, San Mateo, CA (US)

(72) Inventors: Jack Raymond West, San Rafael, CA (US); Brian Atchley, San Rafael, CA (US); Johann Karkheck, San Rafael, CA (US)

(73) Assignee: SOLARCITY CORPORATION, San Mateo, CA (US)

( * ) Notice: Subject to any disclaimer, the term of this patent is extended or adjusted under 35 U.S.C. 154(b) by 0 days.

(21) Appl. No.: 14/882,356

(22) Filed: Oct. 13, 2015

(65) Prior Publication Data

US 2016/0102460 A1 Apr. 14, 2016

Related U.S. Application Data

(60) Provisional application No. 62/062,368, filed on Oct. 10, 2014, provisional application No. 62/083,853, filed on Nov. 24, 2014.

(51) Int. Cl.
*E04D 13/147* (2006.01)
*F24F 13/20* (2006.01)
(Continued)

(52) U.S. Cl.
CPC .......... *E04D 13/1476* (2013.01); *F24F 13/20* (2013.01); *F24J 2/5249* (2013.01);
(Continued)

(58) Field of Classification Search
CPC ........ E04D 13/17; E04D 13/1476; F24F 7/02; F24F 3/20; F24F 7/00; E04F 17/04
(Continued)

(56) References Cited

U.S. PATENT DOCUMENTS 445,522 A 1/1891 Dellinger
510,884 A 12/1893 Bradley, Jr.
(Continued)

FOREIGN PATENT DOCUMENTS

EP 0753703 B1 5/2003
FR 1475051 A 3/1967

OTHER PUBLICATIONS

"4 in. Vent Cap-VC4—The Home Depot," retrieved from the Internet on Nov. 12, 2015, from http://www.homedepot.com/p/Master-Flow-4-in-Vent-Cap-VC4/100396970?MERCH=RV-_-rv_nav_plp_rr-_-NA-_-100396970-_-N (2 pages).
(Continued)

*Primary Examiner* — Robert Canfield
*Assistant Examiner* — Matthew J Gitlin
(74) *Attorney, Agent, or Firm* — Kilpatrick Townsend & Stockton LLP

(57) ABSTRACT

Roof-mounted venting devices adapted for use with roof mounted photovoltaic (PV) panels are provided. Venting devices and assemblies can include a replacement flashing that fits over a cut-down roof pipe vent as well as venting assemblies that redirect airflow from a roof pipe vent. Such replacement flashing can include a substantially planar flashing portion having a raised portion for accommodating any residual flashing or roofing debris. Such replacement flashing may further include a hood portion with one or more vent openings to allow airflow into and out from the interior of the hood portion. Venting assemblies can include a coupling portion for mating with a vent-pipe, a section of hose or piping to redirect airflow, and a venting portion disposed outside or between roof-mounted solar panels.

13 Claims, 20 Drawing Sheets

(51) Int. Cl.
*H02S 20/23* (2014.01)
*F24J 2/52* (2006.01)
*E04D 13/143* (2006.01)

(52) U.S. Cl.
CPC ............ *H02S 20/23* (2014.12); *E04D 13/143* (2013.01); *Y02B 10/12* (2013.01); *Y02B 10/20* (2013.01); *Y02E 10/47* (2013.01)

(58) Field of Classification Search
USPC ..... 52/218, 219, 173.3, 302.1, 302.3, 302.5, 52/302.6, 58; 285/42, 43, 44; 454/366, 454/242, 243, 250, 368, 35
See application file for complete search history.

(56) References Cited

U.S. PATENT DOCUMENTS

| | | | |
|---|---|---|---|
| 912,823 A | 2/1909 | Dehn | |
| 1,264,056 A * | 4/1918 | Geibig | F24F 7/02 454/366 |
| 1,606,410 A * | 11/1926 | Frame | B60H 1/262 454/136 |
| 1,623,659 A | 4/1927 | Comerford | |
| 1,868,730 A | 7/1932 | Dowrie | |
| 1,921,943 A | 8/1933 | Rice et al. | |
| 2,461,729 A | 2/1949 | Glitsch | |
| 2,508,041 A | 5/1950 | Rapisarda et al. | |
| 2,550,353 A * | 4/1951 | Hopfinger | B60H 1/262 454/104 |
| 2,601,820 A | 7/1952 | Paul et al. | |
| 2,692,548 A | 10/1954 | Knorr | |
| 3,183,822 A | 5/1965 | Stone et al. | |
| 3,361,051 A | 1/1968 | Fair et al. | |
| 3,403,809 A | 10/1968 | Kennedy et al. | |
| 3,538,402 A | 11/1970 | Kameron | |
| 3,579,930 A | 5/1971 | Murphy | |
| 3,650,198 A | 3/1972 | Stone | |
| 3,732,800 A * | 5/1973 | Goettel | F24F 13/08 454/281 |
| 4,102,090 A | 7/1978 | Anguish | |
| 4,211,423 A * | 7/1980 | Resech | E04D 13/1407 277/636 |
| 4,265,058 A | 5/1981 | Logsdon | |
| 4,280,305 A | 7/1981 | Logsdon | |
| 4,297,818 A | 11/1981 | Anderson | |
| 4,333,660 A * | 6/1982 | Cupit | E04D 13/1476 277/630 |
| 4,386,488 A * | 6/1983 | Gibbs | E04D 13/1407 454/367 |
| 4,399,743 A | 8/1983 | Izzi, Sr. | |
| 4,461,066 A | 7/1984 | Peterson | |
| 4,526,407 A | 7/1985 | Kifer | |
| 4,545,291 A * | 10/1985 | Kutsch | A01K 1/0058 454/365 |
| 4,638,727 A | 1/1987 | Mitchell | |
| 5,010,700 A * | 4/1991 | Blair | E04D 13/1476 285/42 |
| 5,222,334 A * | 6/1993 | Hasty | E04D 13/1476 285/4 |
| 5,317,845 A * | 6/1994 | Bodycomb | E04D 13/1407 285/42 |
| 5,390,451 A | 2/1995 | Kopp et al. | |
| 5,472,241 A | 12/1995 | Kosik, Jr. et al. | |
| 5,568,947 A * | 10/1996 | Paquette | E04F 17/04 285/192 |
| 5,630,752 A | 5/1997 | Gubash | |
| 5,749,780 A | 5/1998 | Harder et al. | |
| 6,183,360 B1 * | 2/2001 | Luter, II | F24F 7/02 454/366 |
| 6,244,006 B1 | 6/2001 | Shue et al. | |
| 6,293,862 B1 * | 9/2001 | Jafine | F24F 7/02 454/359 |
| 6,302,787 B1 | 10/2001 | Graft, Jr. | |
| 6,447,390 B1 | 9/2002 | O'Hagin | |
| 6,612,924 B1 | 9/2003 | Mantyla et al. | |
| 6,767,281 B2 | 7/2004 | McKee | |
| 6,780,100 B1 | 8/2004 | Gretz | |
| 6,892,499 B1 * | 5/2005 | Mayle | E04D 13/1407 285/42 |
| 6,978,803 B2 | 12/2005 | Brown et al. | |
| 7,219,473 B2 | 5/2007 | Mantyla et al. | |
| 7,338,359 B2 | 3/2008 | Grossman et al. | |
| 7,484,533 B1 | 2/2009 | Arndt | |
| 7,784,242 B2 | 8/2010 | Warnecke | |
| D625,800 S * | 10/2010 | Daniels | D23/373 |
| 7,882,670 B2 | 2/2011 | West | |
| 7,930,858 B2 | 4/2011 | Lajewski | |
| 8,109,048 B2 | 2/2012 | West et al. | |
| 8,181,403 B1 | 5/2012 | Polston | |
| 8,209,923 B1 | 7/2012 | Rich | |
| D666,285 S | 8/2012 | Schrad et al. | |
| 8,240,093 B2 | 8/2012 | Lajewski | |
| 8,298,053 B2 | 10/2012 | Parry | |
| D672,450 S | 12/2012 | Milks et al. | |
| 8,375,654 B1 | 2/2013 | West et al. | |
| 8,397,438 B2 * | 3/2013 | Hoy | E04D 13/1407 285/43 |
| 8,453,389 B2 * | 6/2013 | Selke | E04D 13/1476 52/58 |
| 8,484,914 B2 * | 7/2013 | Cline | E04D 13/1476 52/219 |
| 8,534,002 B2 | 9/2013 | McDow, Jr. et al. | |
| 8,574,045 B2 | 11/2013 | Warner | |
| 8,650,833 B1 * | 2/2014 | Polston | F24F 7/02 454/250 |
| 9,243,813 B2 | 1/2016 | Mantyla et al. | |
| 2004/0148883 A1 * | 8/2004 | Lutz | E03C 1/12 52/300 |
| 2005/0011137 A1 | 1/2005 | Baker | |
| 2006/0211356 A1 | 9/2006 | Grassman | |
| 2006/0223437 A1 * | 10/2006 | O'Hagin | F24F 7/02 454/366 |
| 2006/0240762 A1 * | 10/2006 | Railkar | F24F 7/02 454/260 |
| 2007/0173191 A1 | 7/2007 | Daniels, II et al. | |
| 2008/0070494 A1 * | 3/2008 | Henry | E04D 1/30 454/365 |
| 2009/0113823 A1 | 5/2009 | Osborne | |
| 2010/0000166 A1 | 1/2010 | Lajewski | |
| 2011/0000526 A1 | 1/2011 | West | |
| 2011/0294412 A1 * | 12/2011 | Vagedes | F24F 7/02 454/242 |
| 2012/0073239 A1 | 3/2012 | Haines | |
| 2013/0328300 A1 * | 12/2013 | Bond | B26D 3/00 285/42 |
| 2014/0065946 A1 * | 3/2014 | Tovmasyan | E04D 13/17 454/358 |
| 2014/0106661 A1 | 4/2014 | Baldwin et al. | |
| 2014/0194053 A1 | 7/2014 | Carroll | |
| 2014/0246549 A1 | 9/2014 | West et al. | |
| 2015/0056903 A1 | 2/2015 | Nagano et al. | |
| 2015/0240499 A1 | 8/2015 | Wey | |
| 2016/0040898 A1 | 2/2016 | Lipinski | |
| 2016/0053499 A1 | 2/2016 | West et al. | |
| 2016/0102885 A1 | 4/2016 | Karkheck et al. | |

OTHER PUBLICATIONS

"A PVC eCap cap vent cover to protect pvc plumbing heating 90 percent vent pipes from birds, squirrels," retrieved from the Internet on Nov. 11, 2015, from http://savepipey.net/about-the-ecap.html (10 pages).

"Installation Guide—Critter Quitter," retrieved from the Internet on Nov. 11, 2015, from http://critterquitter.com/installation-guide/ (5 pages).

"JS26700—Josam 26700 Vandal Proof Vent Cap—Roof Drains by Commercial Plumbing Supply," retrieved from the Internet on Nov. 12, 2015, from http://commercialplumbingsupply.com/proddetaitasp?prod=JS26700 (2 pages).

"Oatey Mushroom Vent Cap 43805 | Zoro.com," retrieved from the Internet on Nov. 12, 2015, from http://www.zoro.com/oatey-mush-

(56) References Cited

OTHER PUBLICATIONS room-vent-cap- 43805/i/G6227453/?utm_source=google_shopping&utm_medium=cpc&utm_campaign=Google_Shopping_Feed &gclid=CJK6oKbNkscCFYEYHwod54ALig&gclsrc=aw.ds (2 pages).
"OdorHog Vent Pipe Filter Products," retrieved from the Internet on Nov. 12, 2015, from http://www.odorhog.com/consumer.htm (4 pages).
"Plumbing Vent Caps—Vents—Old World Distributors, Inc.," retrieved from the Internet on Nov. 12, 2015, from http://www.oldworlddistributors.com/vents-plumbing-vent-caps/ (1 page).
"The Forever Cap 4 in. Round Fixed Stainless Steel Plumbing Vent Cap-FDVC4—The Home Depot," retrieved from the Internet on Nov. 12, 2015, from http://www.homedepot.com/p/The-Forever-Cap-4-in-Round-Fixed-Stainless-Steel-Plumbing-Vent-Cap-FDVC4/203735910 (2 pages).
Unpublished U.S. Appl. No. 14/831,342, filed Aug. 20, 2015, titled "Exhaust Gas Panel Vent Assembly for Roof-Mounted Photovoltaic Systems," by Jack Raymond West et al.
Unpublished U.S. Appl. No. 14/878,965, filed Oct. 8, 2015, titled "Vent Cover Assembly for Use With Roof-Mounted Photovoltaic Systems," by Jack Raymond West et al.
U.S. Non-final Office Action dated Oct. 5, 2015, from U.S. Appl. No. 14/831,342 (12 pages).
U.S. Appl. No. 14/831,342, Non-Final Office Action dated Feb. 26, 2016, 14 pages.
U.S. Appl. No. 14/831,342, Final Office Action dated Mar. 17, 2017, 14 pages.

\* cited by examiner

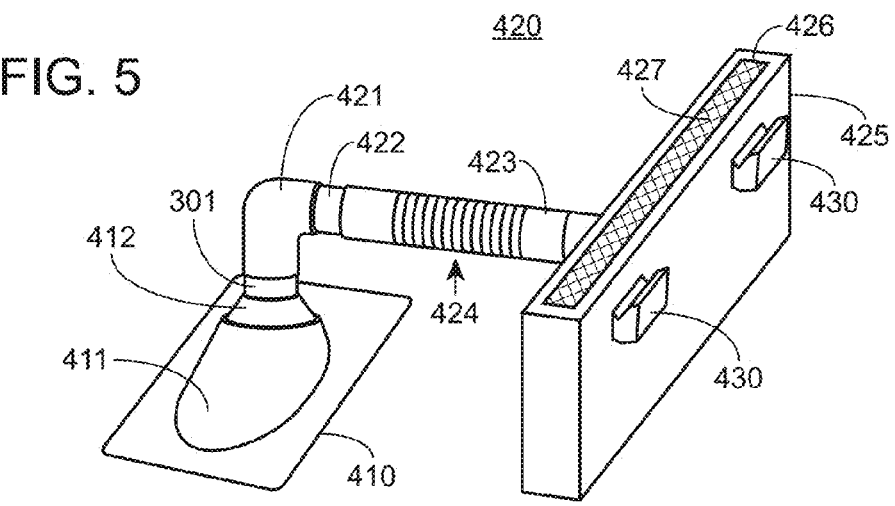
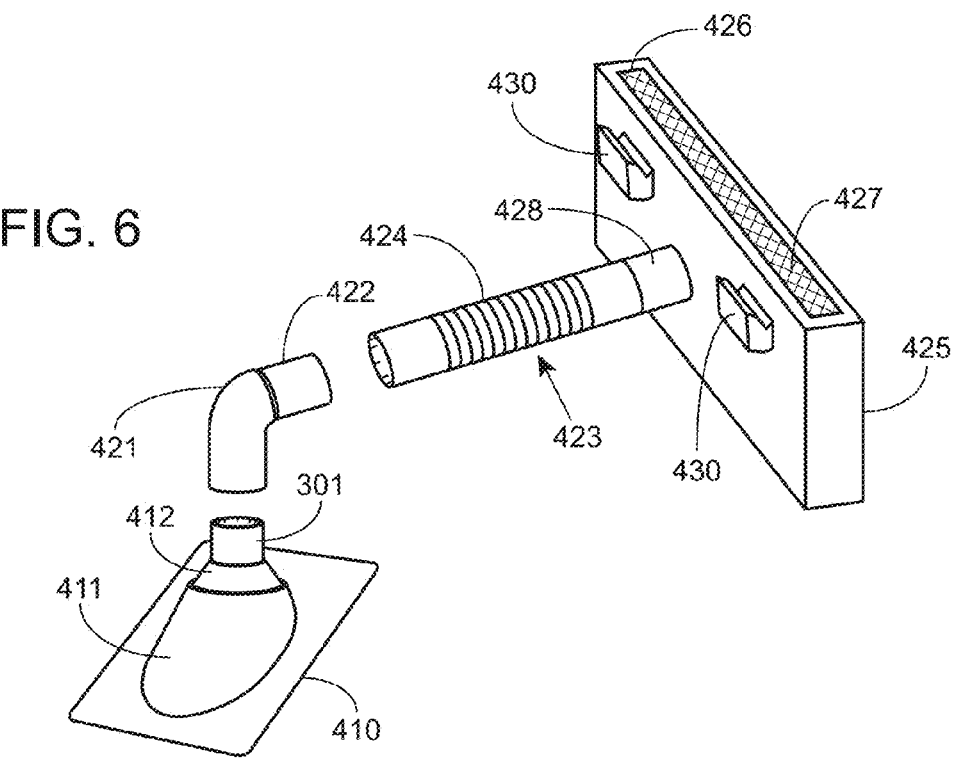

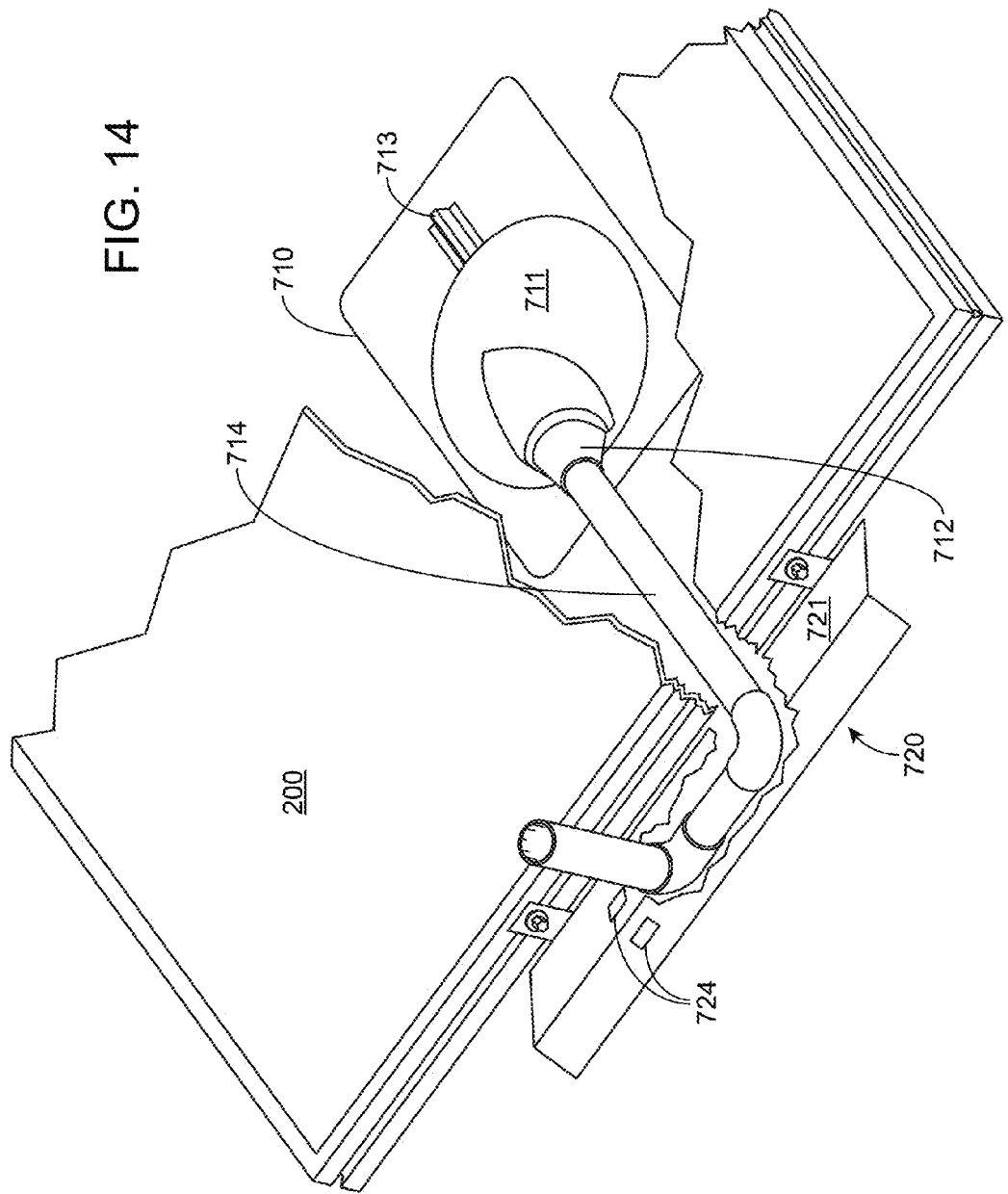

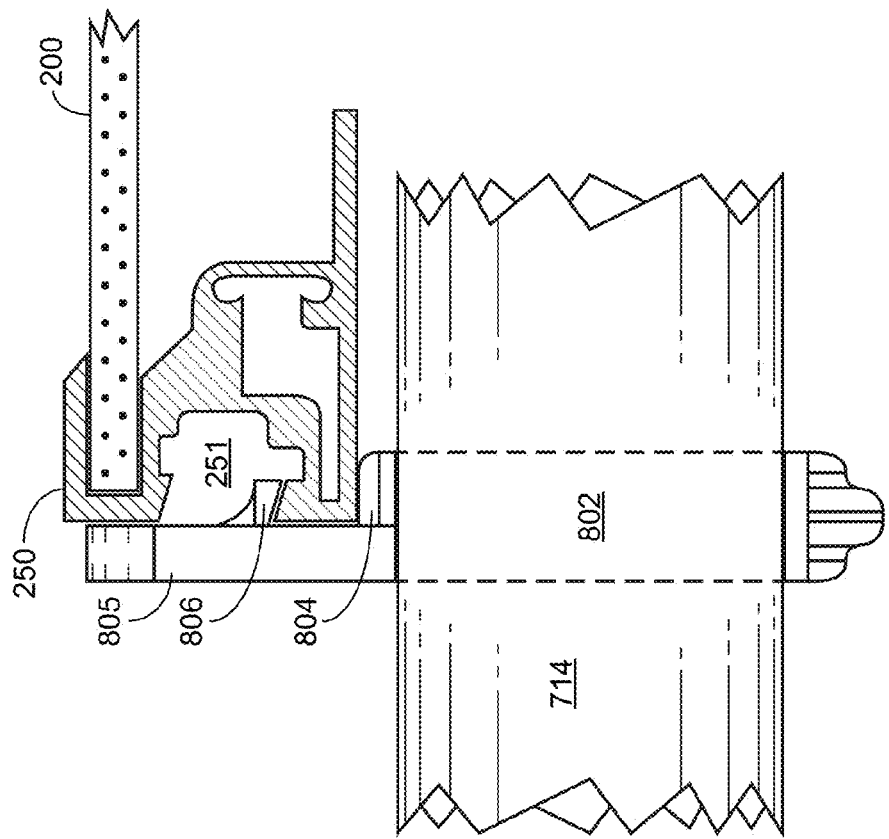
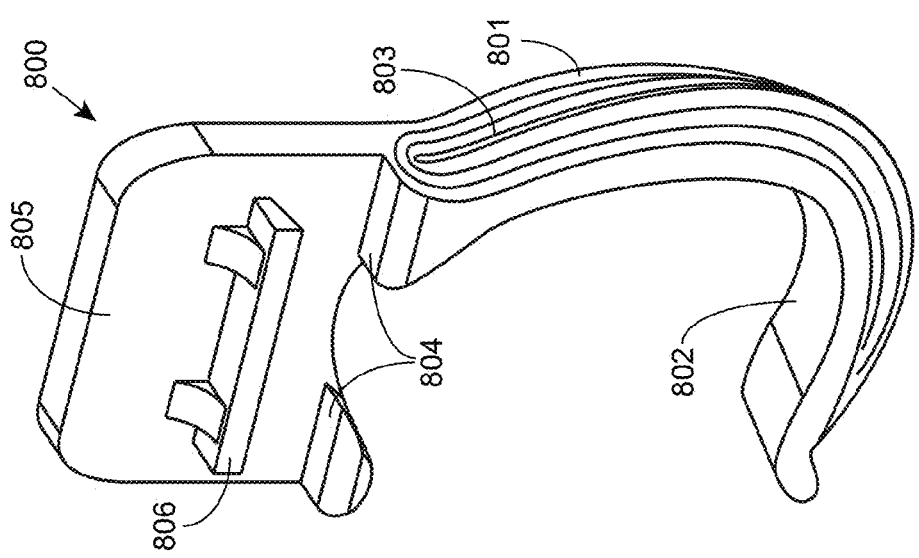
FIG. 15A
FIG. 15

REPLACEMENT FLASHING FOR EXHAUST GAS VENTS BENEATH ROOF-MOUNTED PHOTOVOLTAIC SYSTEMS

CROSS REFERENCE TO RELATED APPLICATIONS

This claims the benefit of priority of U.S. Provisional Patent Application Nos. 62/062,368 filed on Oct. 10, 2014; and 62/083,853 filed on Nov. 24, 2014, each of which is incorporated herein by reference in its entirety.

This is related to U.S. Provisional Patent Application Nos. 62/040,174 filed on Aug. 21, 2014; and Ser. No. 14/831,342 filed on Aug. 20, 2015, each of which is incorporated herein by reference in its entirety for all purposes.

FIELD OF THE INVENTION

The instant invention relates generally to photovoltaic systems ("PV" or "solar") and in particular to roof-mounted solar systems on sloped roofs.

BACKGROUND

Solar power is becoming increasingly popular as a source of renewable energy as advances in panel efficiency and manufacturing techniques have driven down the cost per kilowatt. This has led to double-digit annual growth in solar installs and projections of even greater growth in the future. Another factor driving growth has been the availability of solar leases, power purchase agreements, and other financial products that allow customers to have solar systems installed with little or no money down. The installer/owner of the system receives any tax incentives associated with the install and the customer pays either a fixed lease payment or for the energy generated by the system. In jurisdictions that allow net metering, excess power is sold back to the utility by reverse flow through the homeowner's power meter.

Solar installation companies normally attempt to maximize the energy generating capacity of the array on the sun-facing portion of the roof. One problem that often arises with rooftop installations is that roofs may contain one or more sewer gas exhaust pipes. In some cases these pipes may protrude from the portion of the roof surface best suited for the solar array in an area that would otherwise be desirable to place a solar panel. To deal with this issue, project planners and installers often are forced to design and install the PV array to bypass these obstructions leaving a gap in the array.

FIG. 1 illustrates this problem. FIG. 1 shows a portion of a residential roof 100 with installed solar array 200, which includes 23 individual solar panels 200. As used herein, the terms "module" and "panel" will be used interchangeably to refer to a photovoltaic panel, which can include a string of solar cells encased in a frame or other protective structure that converts impinging photons into electrical current. As shown in array 200 of FIG. 1, there is a panel missing at spot 205 that would otherwise be part of the array but for the presence of sewer gas exhaust vent 300. Although in FIG. 1 vent 300 is shown near the middle of the top row of solar panels, it should be appreciated that in practical application, vent 300 may exist nearly anywhere in roof 100 and displace a panel in array 200 leaving a hole somewhere in the middle or a gap along either side. Moreover, even though single vent 300 is shown in FIG. 1, it is not uncommon to have two or more vents clustered in a single roof above the positions of the waste water lines, particularly in larger homes.

Solar panel array 200 is depicted in FIG. 1 in a portrait or "North-South" orientation; other embodiments contemplate solar panels that are installed in a landscape or "East-West" orientation. The various embodiments of the invention will work with either configuration, or even configurations that are at some angle between portrait and landscape or any combination thereof.

In addition to detracting from the aesthetics of the install, each gap in the PV array that could have otherwise supported a solar panel represents less revenue for the array owner—whether it's the homeowner or a panel installer/leaser—in an amount equivalent to multiple times the cost of the installed panel. If the average install is about five kilowatts and each panel is capable of generating 250 Watts, as much as five percent of the solar potential could be lost on an install with only one missing panel.

Unfortunately, sewer gas exhaust pipes cannot be removed because they serve an important function. They equalize atmospheric pressure to the sewer stack so that shower, tub, sink and toilet drains will all drain properly. They also allow flammable and harmful sewer gases to vent above the building so that they do not accumulate within any living space inside the building. Although there are alternatives to roof venting, such as air admittance valves (AAVs), so-called Durgo valves or Studor vents, they are not in widespread use. These are one-way mechanical vents that eliminate the need for conventional roof venting. A discharge of wastewater, such as from a toilet flush causes the AAV to open, releasing the vacuum and allowing air to enter the plumbing system for proper drainage to occur. Such valves are more commonly used in Europe and are even prohibited by code in some jurisdictions in the United States, which may explain why roof vents are essentially ubiquitous in the United States. Also, replacing existing sewer gas exhaust vents with AAVs is not a viable solution because it would significantly increase the time and cost of a PV system install.

FIG. 2 shows a close-up perspective view of sewer gas roof vent 300 depicted in FIG. 1. Vent 300 includes a protruding metal or PVC vent pipe 301 with pipe opening 302. Although not shown in the Figure, pipe 301 runs down to either the sewer stack within the residence or into one of the wastewater drainage pipes that feeds into the stack somewhere before it reaches the stack. In order to prevent water leakage, flashing plate 310 is usually slid down over pipe 301 from the open end through an opening in rubber collar 312. Flashing plate 310 may also have raised portion 311 to compensate for the pitch of the roof (i.e., the pipe does not penetrate flashing plate 310 normal to its surface, but rather at an angle off of normal specified by 90 degrees minus the pitch of the roof). In some cases raised portion 311 may be eliminated and rubber collar 312 will instead be shaped to compensate for roof pitch. In a shingled roof, such as that depicted in FIG. 2, the top and optionally the side portions of flashing plate 310 may be tucked underneath the surrounding roof shingles so that water running down the roof will run over the flashing plate without leaking through the roof.

It is possible on certain homes no flashing plate is present. This could be due, for example, to the addition of a new roof, poor original construction, or non-standard repairs. In such cases, a large bead of caulk, tar, or other high temperature sealant may be placed around the opening in the roof where vent pipe 301 penetrates the roof to prevent water from leaking through the roof. The various embodiments of the current invention will work in either circumstance.

FIG. 3 shows an isolation perspective view of a flashing plate such as that shown in FIGS. 1 and 2; FIG. 4 is a side view of the exhaust pipe and flashing plate on a roof with an existing solar panel array. Flashing plate 310 is typically constructed from sheet metal such as aluminum, steel, or other suitable durable material. As discussed above, plate 310 may have raised portion 311 that creates a horizontal or substantially horizontal pedestal for attaching rubber collar 312. Collar 312 has opening 313 sized such that it creates a water-proof friction fit with a sewer exhaust gas pipe when slid over exhaust pipe 301, thereby preventing the ingress of water.

FIG. 4 shows flashing plate 310 on roof 100 with solar panel array 200. Solar panel array 200 stops down-roof from plate 310 and pipe 301 because the pipe 301 extends higher than the array. In FIG. 4, array 200 is installed on roof 100 in a strutless configuration using a height-adjustable mounting assembly comprising mounting puck 211, adjustable leveling screw 212, and male groove connector 212 that clips into grove 251 formed in panel frame 250. As can be seen in FIG. 4, the presence of exhaust pipe 301 prevents placement of a solar panel over the roof in the area where vent 300 is located. Therefore, it would be desirable to provide roof venting in a manner that allows placement of solar panels over areas being used for exhaust venting without substantially impeding exhausting venting and with minimal complication and expense.

BRIEF SUMMARY

The invention relates to roof-mounted exhaust venting devices and assemblies for use with roof-mounted solar systems. In particular, the invention relates to venting devices and assemblies that provide for exchange of gas and air through a roof vent within a clearance suitable for installation of a solar system directly over the roof vent.

In various embodiments, such exhaust venting devices may include a replacement flashing with a substantially flat or planar flashing portion for mounting to a flat-sloped roof and having a raised portion to accommodate any residual flashing and/or roof debris. In some embodiments, the raised portion is circumscribed by the planar flashing portion. The raised interior portion can be formed in a generally oval or pill shape elongated along a slope direction of the roof when mounted thereon. In some embodiments, the raised interior portion protrudes from the planar flashing portion a distance between 0.25 inches and about 6 inch, such as between 1 inch and about 4 inches. Typically, the raised interior protrudes from the planar flashing portion a distance of about 4 inch or less.

In some embodiments the replacement flashing further includes a hood portion protruding from the raised portion that is shaped to fit over a cut-down roof pipe vent. The hood portion includes vent openings that permit airflow into and out of the hood portion and through the pipe vent. In various embodiments, the hood portion can include one or more vent openings that open towards a down-roof direction when the flat flashing portion is mounted against the roof. The one or more vent openings can include a series of vent openings along a side of the hood portion. The vent openings may be formed in various shapes, such as circular opening or slots, and may include louvers to direct run-off and debris away from entering the vent opening.

In various embodiments, the hood portion can include a top surface and one or more side surfaces in which the one or more vent openings are disposed. The one or more side surfaces can include a continuous surface extending about the hood portion, which can be advantageous in providing a smooth surface for flow water down the roof and to inhibit collection of debris on the hood portion. The one or more vent openings can be, for example, elongated slots. The slots may be arranged to extend in a transverse direction from the roof surface when the exhaust gas replacement flashing is disposed thereon. The elongated slots can include a series of louvered slots, each having a louver angled toward a roof down direction to prevent passage of run-off and debris into the hood portion. The hood portion can be formed in a generally oval or pill shape elongated along a slope direction of the roof when mounted thereon or in a substantially circular shape. Such shapes are advantageous as it provides more area on the sides of the hood portion for the one or more vent openings.

In various embodiments, the replacement flashing may include a raised portion and a housing that fits over the cut off vent pipe and is connectable to a venting assembly can include a pipe extension for rerouting venting to an area outside or between roof-mounted solar panels. In some embodiments, such an assembly can include a planar flashing plate having a raised portion and housing with an integral collar for fitting over an existing rooftop sewer gas exhaust vent pipe and a piping extension coupling the exhaust vent pipe to a vent portion. This can allow sewer gas emitted from the sewer gas exhaust pipe to exit into the atmosphere above or away from a photovoltaic array. In some embodiments, the piping extension can include a flexible hose portion that may be attached to a frame of a solar panel, such as in a seam between adjacent panels or in a mounting groove formed in a frame of at least one panel. Such embodiments may use various types of attachment mechanisms so that the vent portion is substantially co-planar with or higher than the photovoltaic array.

In some embodiments, the replacement flashing may include a substantially planar flashing portion having a raised portion with an opening through which the cut-off exhaust vent pipe extends and a gasket or collar for sealing the replacement flashing against the vent pipe. It is appreciated that such an embodiment could be used in combination with various other replacement flashing described herein so as to ensure sealing of the vent-pipe and adequate clearance for installation of a solar panel over the cut-off vent pipe.

BRIEF DESCRIPTION OF THE DRAWINGS

FIGS. 5-11 show several views of example exhaust gas panel vent assemblies for use with roof-mounted photovoltaic systems in accordance with some embodiments of the invention.

FIGS. 12-14 show several views of example exhaust gas cap vent assemblies with extension piping for use with roof-mounted photovoltaic systems in accordance with some embodiments.

FIGS. 15-17 show coupling mechanisms for securing extension piping of exhaust gas cap vent assemblies in accordance with some embodiments.

DETAILED DESCRIPTION

Figure 1:
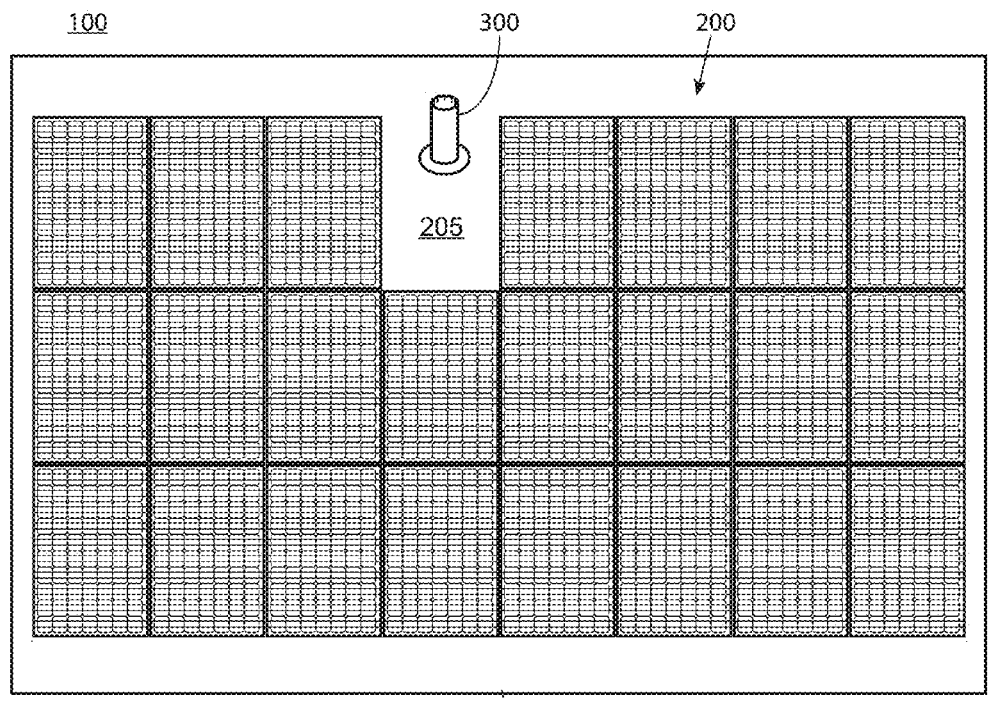
FIG. 1 shows a roof-mounted photovoltaic system that includes a gap to provide clearance for a conventional exhaust vent according to the prior art.

Venting devices and assemblies in accordance with embodiments of the invention can include venting assemblies that redirect air flow from a roof pipe vent to an area outside or between solar panels, as well as replacement flashing caps that fit over a cut-down roof pipe and allow for venting beneath one or more roof-mounted solar panels.

FIGS. 5 and 6 illustrate an exhaust gas panel vent assembly 420 for a roof-mounted photovoltaic system according to various embodiments of this invention. In the embodiment shown in FIG. 5 the assembly includes a low profile flashing plate 410 with rubber collar 411. The raised portion of the flashing plate has been eliminated to lower the overall height of the top of collar 411. In other embodiments the flashing plate may include a raised portion. A portion of exhaust pipe 301 still protrudes through opening 412 in collar 411 after flashing plate 410 has been slid over pipe 301. In various embodiments, it may be desirable to cut down pipe 301 using a hack saw, reciprocating saw or other cutting tool so that pipe 301 protrudes a shorter distance above rubber collar 411. In various embodiments, assembly 420 may include elbow portion 421 with openings at either distal end. Elbow portion 421 may be a 90-degree elbow, a 45-degree elbow or some other angle depending upon the pitch of the roof and desired direction of use (i.e., up the roof, across the roof, down the roof, etc.). In various embodiments, one end of elbow portion 421 may be sized to slide over pipe 301. In various other embodiments, the same end of elbow portion 421 may be sized to slide inside of exhaust pipe 301. In various embodiments, the fit between elbow portion 421 and pipe 301 will be a friction fit. In various other embodiments, the fit may be assisted by threads, pipe cement, sealing adhesive, and/or other airtight attachment mechanism depending on the material used to make pipe 301 and elbow portion 421, and in accordance with any relevant building codes and/or standards.

In various embodiments, the other distal end of elbow portion 421 may include connecting portion 422 for mating elbow portion 421 with flexible hose portion 423. As with the fit between elbow portion 421 and pipe 301, flexible hose portion 423 may fit inside connecting portion 422 or outside connecting portion 422. Moreover, the fit between connecting portion 422 and hose 423 may be a friction fit or may be assisted by threads, pipe cement, sealing adhesive, and/or other airtight attachment mechanism. Flexible hose 423 may include flexible section 424 somewhere along the length of hose 423. Ideally, this flexible section 424 will allow the hose to change direction and to be expanded and/or contracted in length as necessary within a minimum and maximum range.

Assembly 420 can further include panel vent 425, which can include an essentially rectangular box. Panel vent 425 mates with flexible hose portion 423 via integral male coupler 428, for example. Also, flexible hose portion 423 may slide over male coupler 428 or may fit inside coupler 428. As with other connections in assembly 420, fit between male coupler 428 and flexible hose portion 423 may be assisted with threads, pipe cement or other suitable adhesive sealant, and/or other airtight attachment mechanism.

Panel vent 425 can include top facing opening 426 that allows air from the pipe 301 to exit into the air above the roof. In various embodiments, vent 425 may include screen 427 or other mechanism that will prevent entry of bugs and rodents without substantially impairing airflow. In various embodiments, panel vent 425 may also include one or more male connectors 430 located on the outside surface of one or more long sides of vent 425 that enables vent 425 to be attached to a reciprocal groove in the frame of a solar panel having such a mounting groove. In other embodiments of the invention, panel vent 425 may be adapted to connect to a solar panel frame without a groove, such as by connecting to a flange of the frame or by wrapping around the frame or connecting to a male feature of the frame. For example, panel vent 425 may have upper and lower flanges that extend out perpendicularly from one or both long side portions and in the plane of a solar panel thereby enabling panel vent 425 to be attached to any side edge of a panel frame (i.e., top, bottom or sides) by inserting the frame into the opening created by the upper and lower flanges. In various embodiments, one or more of the top and bottom flanges of panel vent 425 may have a ridge at the end that engages a vertical edge of the panel thereby detachably holding vent 425 to the panel. It should be appreciated that various embodiments of the invention may also be utilized with solar arrays that use struts to attach panels to the roof.

In various embodiments, when assembly 420 is attached to vent pipe 301, exhaust gases will flow up through vent pipe 301 into elbow portion 421, through flexible hose portion 423 and into panel vent 425 via male connector 428 and out top opening 426. In various embodiments, panel vent 425 may be substantially hollow so that exhaust gas flowing into the inner portion will flow unimpeded out of top-facing opening 426. The panel vent can be dimensioned so that the top-facing opening is at least as large as the original exhaust vent opening so as to ensure exhaust flow will not be inhibited. In some embodiments, the top-facing opening is elongated and is substantially larger, for example at least twice as large, as the original exhaust vent opening so that any change in direction of flow of the exhaust does not inhibit exhaust of gases.

Figure 7:
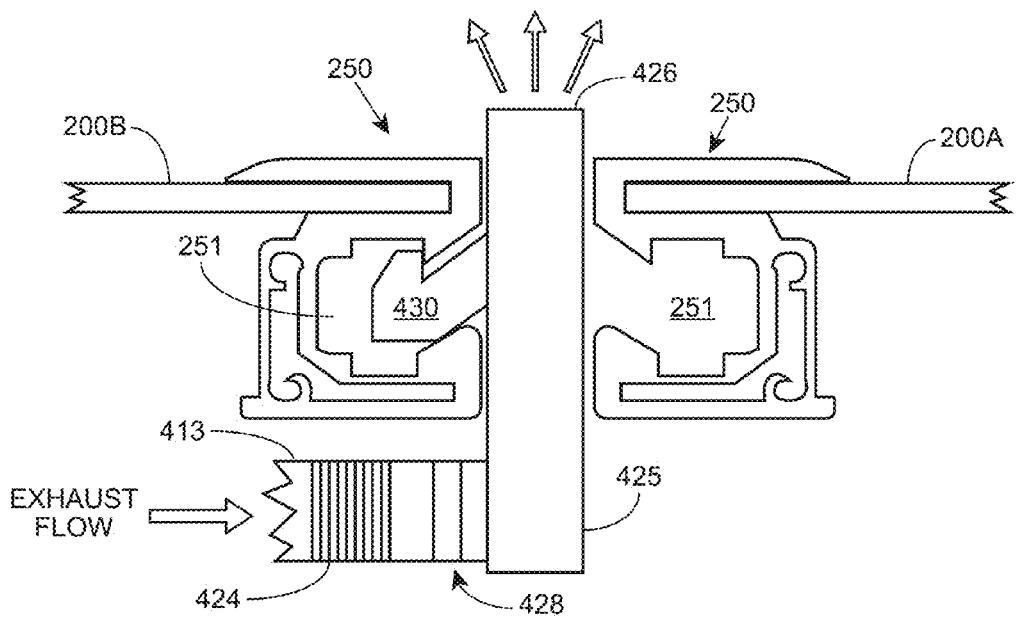
Figure 7A:
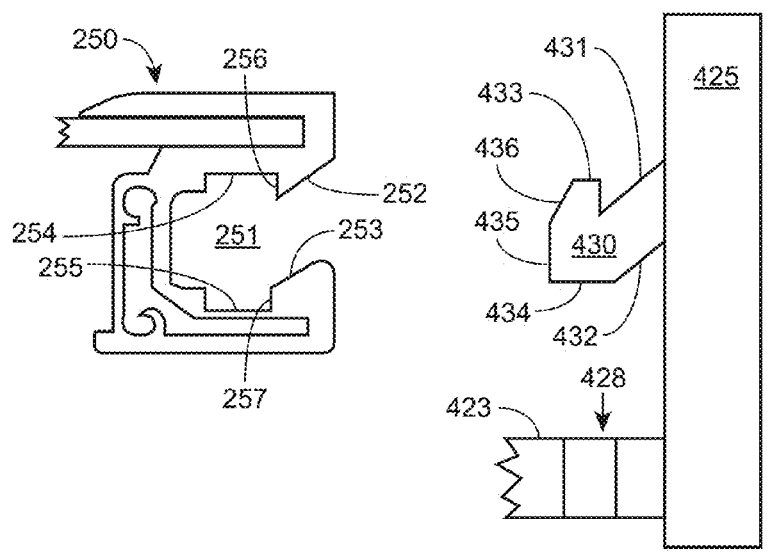

Referring now to FIGS. 7 and 7A, these figures are cross-sectional views that illustrate the attachment mechanism that enables panel vent box 425 to mate with frame 250 of solar panel 200B and/or to be mated between successively coupled solar panels 200A and 200B according to one exemplary embodiment of the invention. A frame of an integrated solar panel, such as frame 250, and corresponding groove 251, may be seen in greater detail, for example, in U.S. Pat. Nos. 8,375,654 and 8,109,048, and published U.S. Patent Application No. 2011/0000526, all of which are incorporated herein by reference in their entireties.

As shown in FIG. 7A, panel vent 425 may include one or more male connectors 430 that are particularly shaped so they will mate with female mounting groove 251 in frame 250 to hold panel vent 425 in place. In various embodiments, male connectors 430 may include top and bottom downward angled portions 431 and 432 that are shaped to match respective downward angled portions 252 and 253 at the entrance to female mounting grove 251 of frame 250. In various embodiments, male connector 430 may further include top and bottom horizontal portions 433 and 434 as well as vertical portion 435. When attached to a frame, such as frame 250, top and bottom horizontal portions 433 and 434 are retained in female mounting groove 251 by flanges or lips 256 and 257. In various embodiments, chamfered notch 436 may be formed in top horizontal portion 433 of each male connector 430 to enable connectors 430 to be twistably locked into female mounting groove 251 of frame 250 with less resistance. In other embodiments, connector 430 may include another mechanism for connecting to frame 250 of a solar panel such as press-fit, snap-in, fastener, pivot lock, etc. Such modifications will be apparent to one of ordinary skill in the art.

As seen in the exemplary embodiment illustrated in FIG. 7, the dimensions of panel vent 425 are such that it is able to fit between adjacent solar panels without modification to the normal interconnect and panel spacing that would be used if panel vent 425 were not present. Furthermore, although in FIGS. 7 and 7A connectors 430 are only shown on one side of panel vent 425, in various embodiments it may be desirable to include connectors on both sides of panel vent 425 so that the vent box can be mechanically coupled to frames 250 on both sides. Alternatively, a single connector or more than two connectors may be used on one or both sides of panel vent 425 without departing from the spirit or scope of the invention.

Figure 8:
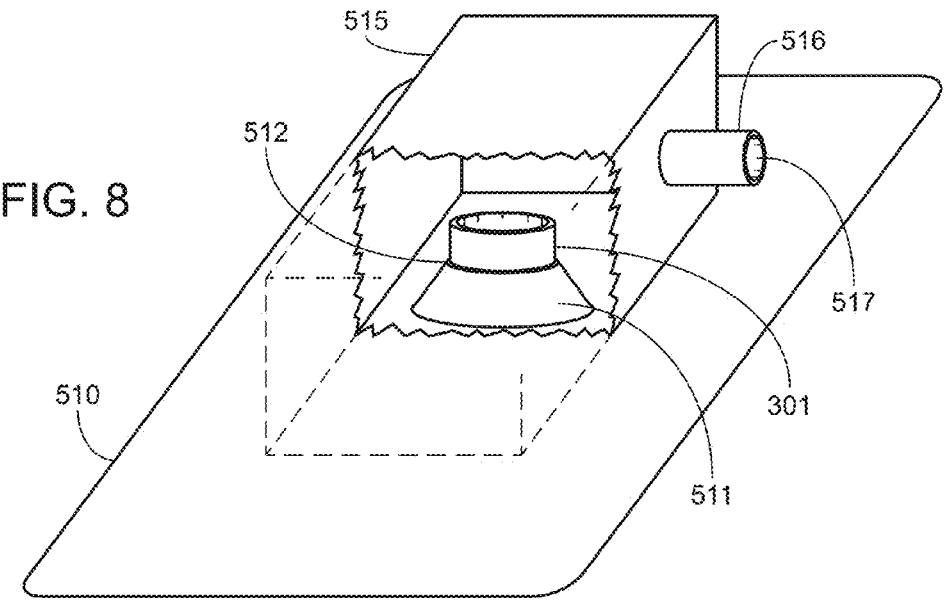

FIG. 8 is a partial cut-away perspective drawing that illustrates an alternative embodiment of the exhaust gas panel vent assembly according to one or more other embodiments of the invention. In the embodiment illustrated in FIG. 8, flashing plate 510 can include rubber collar 511 with opening 512 at the top to allow vent pipe 301 to pass through. As with other embodiments, it may be desirable to cut down vent pipe 301 prior to installing flashing plate 510 to reduce the extent to which it protrudes above rubber collar 511. In the exemplary embodiment shown in FIG. 8, flashing plate 510 includes box 515 that fits over pipe 301 and collar 511 to create an airflow path to exhaust pipe 516. In various embodiments, box 515 may be formed integrally with flashing plate 510 and out of the same material. Box 515 may also optionally be attached to flashing plate 510 after it has been placed over pipe 301 and secured to the roof. Such attachment may be made airtight using various known methods such as a gasket, sealing adhesive, caulk, tar, screws, or other suitable material. In various embodiments, a flexible hose portion, such as portion 423 shown in FIGS. 5 and 6, may be attached to exhaust pipe 516 in a manner similar to the flexible hose attachment discussed in the context of FIGS. 5 and 6, so that exhaust gas can flow from exhaust pipe 301 through box 515, into exhaust pipe 516 and out opening 517, into flexible hose portion 423, eventually terminating in panel vent box 425 and existing through opening 426.

It should also be appreciated that in various embodiments, in particular where box 515 is formed separately from flashing portion 510 and attached at the time of installation, box 515 may include an integral elbow portion (not shown) similar to that shown in FIGS. 5 and 6 located within the space defined by the top and sides of box 515 that fits over pipe 301 at the bottom opening and terminates through outer wall of box 525 as exhaust pipe 516. Such a configuration may be advantageous for at least two reasons: first to improve the overall aesthetics as compared to the embodiments illustrated in FIGS. 5 and 6 where the elbow portion 421 is visible, by concealing the elbow inside a box, and second to prevent the accumulation of methane exhaust gas within the confines of box 515. It should also be appreciated that box 515 depicted in FIG. 8 has exaggerated dimensions for ease of illustration. In various embodiments box 515 may be only slightly larger than the outer dimensions of exhaust pipe 301 in order to minimize materials, improve aesthetics and reduce the possibility of methane gas remaining in box 515.

Figure 9:
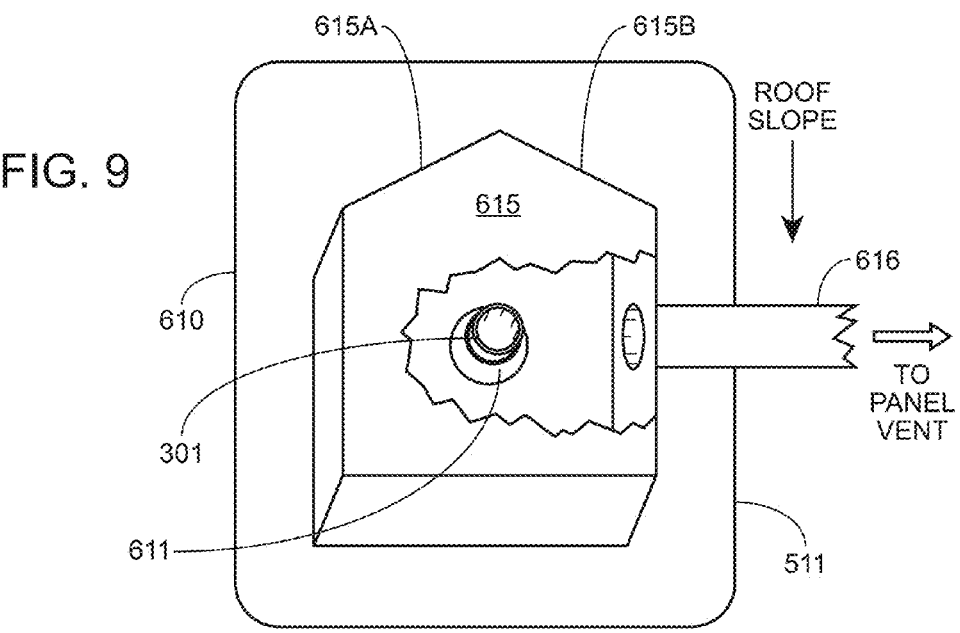

FIG. 9 is a partial cut-away view of yet another alternative embodiment of the invention. In FIG. 9, flashing plate 610 includes box 615, which can have two angled sides 615A and 615B at the up-roof facing portion. The purpose of this modification is to prevent rainwater from accumulating at the up-roof facing surface of box 615 by diverting it around the sides. Otherwise, the embodiment shown in FIG. 9 is similar to that shown in FIG. 9. Likewise, box 615 of FIG. 9 may also include an integral elbow portion for direct connection between pipe 301 and exhaust pipe 616 or it may fit over an elbow portion as previously described.

Although exhaust pipes 516 and 616 shown in FIGS. 8 and 9 protrude from the side, it may be desirable, or in some cases to comply with code, even necessary, that the pipes exit respective boxes 515 and 615 in the up-roof facing direction so that the exhaust gas airflow path never goes below or even reaches horizontal. Such modifications are within the spirit and scope of the invention and would be understood by a person of ordinary skill in the art to be consistent with this disclosure.

In various embodiments panel vent 425 may be made out of plastic or other synthetic material. In various other embodiments, panel vent 425 may be made out of anodized aluminum, stainless steel, or other durable and/or resilient material. Furthermore, male connecting portions 430 may be integrally formed into panel vent 425 or may be separate connectors that are attached to one or more long outside vertical sides of panel vent 425 using screws, bolts, a recess-and-channel-type connection, a snap-in connection or other fastening mechanism.

Figure 10:
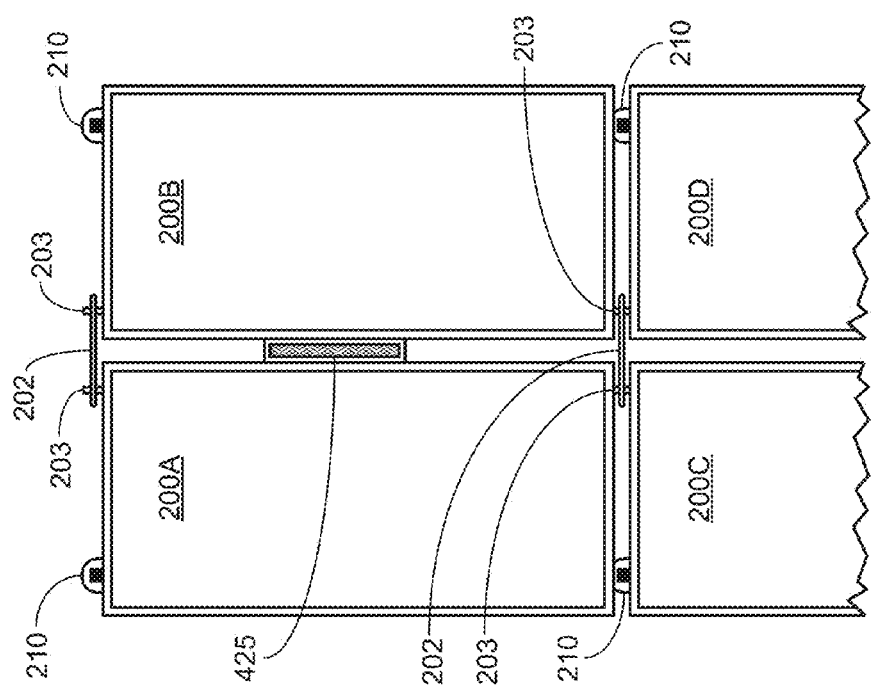

Referring now to FIG. 10, this figure shows solar array 200, which includes four solar panels 200 mounted on a roof (not shown) in a strutless configuration. In various embodiments, panels 200 can be secured to the roof using integrated connectors and height-adjustable mounting portions 210 and are interconnected to one another by interconnect plates 202 and rotating locking connectors 203. Panels 200 are laid out in a North-South configuration (long panel dimension running the from ridge side to the eave side of roof), however, in various embodiments, they may instead be configured in an East-West layout or an angled layout. In the embodiment depicted in FIG. 10, panel exhaust vent 425 is situated vertically between panels 200A and 200B and mechanically attached to one or more of the panels as discussed in the context of FIGS. 5, 6, 7 and 7A. Although not visible because of the cover provided by panel 200A, a flexible hose interconnects panel vent 425 to an exhaust gas vent pipe via either an elbow or box or hybrid elbow/box that connects to a flexible hose portion that is coupled at the opposite end to panel vent 425, thereby permitting sewer exhaust gas to flow naturally and unimpeded into the air above the panel array. In various other embodiments, panel vent 425 may be situated horizontally between two adjacent panels. Moreover, panel vent 425 may in various embodiments contain connectors on both long sides enabling it to function as an interconnect plate interconnecting up to four adjacent modules. In such an embodiment, panel vent 425 will span between the end portions of all four interconnected panels.

In various horizontal embodiments, the top of panel vent 425 may be substantially flush with the top surface of PV array 200 to prevent shading of any portions of the adjacent solar panels. In various other embodiments, the top surface of panel vent 425 may protrude above the top surface of the array by an amount calculated to be the maximum allowable height that will not shade the array more than an acceptable amount (e.g. less than one foot, less than 8 inches), or to any height required by local building codes.

Figure 11:
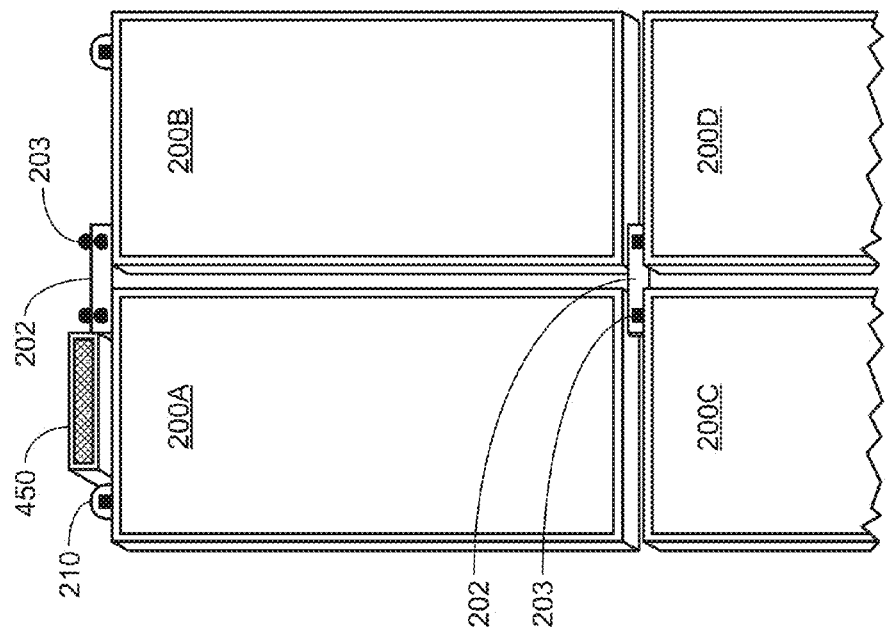

FIG. 11 illustrates yet another variation of the panel exhaust vent according to various embodiments of the invention. In FIG. 11, panel vent 450 has been attached to the top of panel 200B using the attachment mechanism shown and described in the context of FIGS. 5, 6, 7 and 7A. Unlike panel vent 425 in the preceding figures, vent 450 is placed up-roof from the location of the exhaust vent pipe protruding through the roof. This may be necessary to comply with local plumbing or building code by maintaining an upward angle along the airflow path extending from the vertical exhaust pipe through the elbow, box or hybrid elbow/box, flexible hose portion and into the panel vent 450. Another difference between panel vent 450 of FIG. 11 and vent 425 of FIG. 10 is that panel vent 450 is depicted extending some distance above the top or sun-facing surface of panel 200A and the edge of the panel frame. This may be necessary to achieve any requirements for the height of a sewer gas exhaust pipe mandated by local plumbing and/or building code. For example, according to the Uniform Plumbing Code, the stack pipe should extend not less than 6 inches above the roof. Local plumbing and/or building codes may be even more stringent. Because a typical panel may only be raised 3-5 inches above a roof it may be necessary for panel vent 450 to extend several inches higher than the top sun-facing surface of the panel and frame. Also, by placing panel vent 450 at the top of the array, and orienting it at the same angle as panel 200A (i.e., normal or perpendicular to the roof line), panel vent 450 should not appreciably shade the panel 200A to which it is attached, if at all. However, in various embodiments, it may not be necessary for vent 450 to extend substantially above the plane defined by the array.

As described herein, installation of the exhaust gas panel vent assembly for roof-mounted photovoltaic systems requires little additional work for an installer. In various embodiments, a first step will be to design a photovoltaic array layout for the target building as if there are no exhaust gas vents obstructing any portion of the roof that will support the array. Next, installers will begin installing the array up to the point where the next panel or panels would cover the exhaust gas vent. At that point, an installer may reduce the height of the exhaust pipe to a level suitable for use with the panel vent assembly. In various circumstances it may also be necessary to remove any preexisting flashing plate and replace it with a lower profile plate as discussed herein.

The exhaust gas panel vent assembly according to the various embodiments of the invention is connected to the existing exhaust pipe by the elbow, box, hose or other mechanism discussed above, and the remainder of the hose and panel vent assembly laid on the roof oriented in the desired direction of installation (i.e., horizontally or vertically). Then, the panel box can be connected to the frame of the next panel at the desired location before that panel is completely attached to all other surrounding panels and/or support structure. The flexible hose can be extended as necessary to enable the installer to attach the panel vent at the desired portion of the frame of the next panel in the array. In various embodiments, attachment to the panel frame may be by any of the methods or mechanisms discussed herein. After the panel vent is attached to the frame of the next panel, the panel can be attached to the remainder of the array using interconnect plates 202 and rotating locking connectors 203 and/or height-adjustable mounting portions 210, for example.

Figure 2:
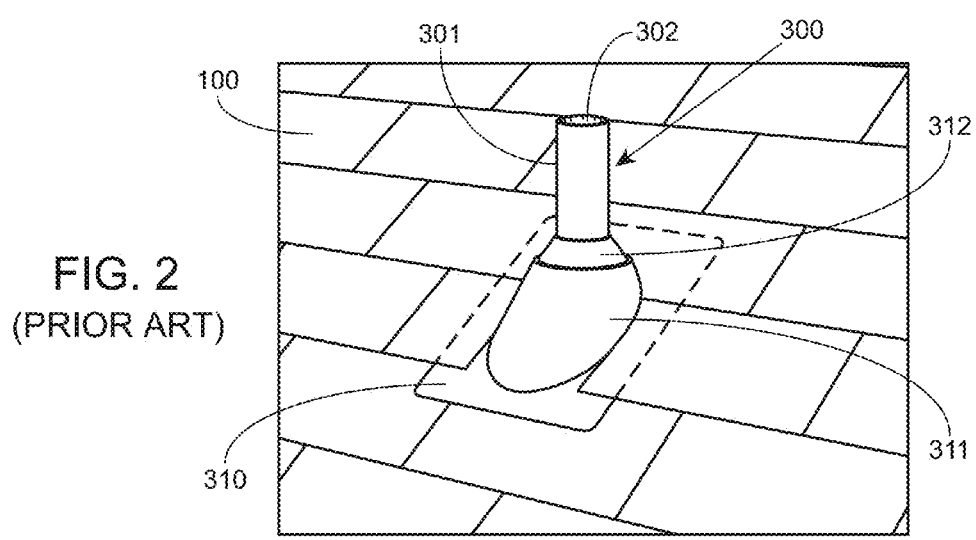
FIGS. 2 and 3 show a conventional roof exhaust vent according to the prior art.
Figure 3:
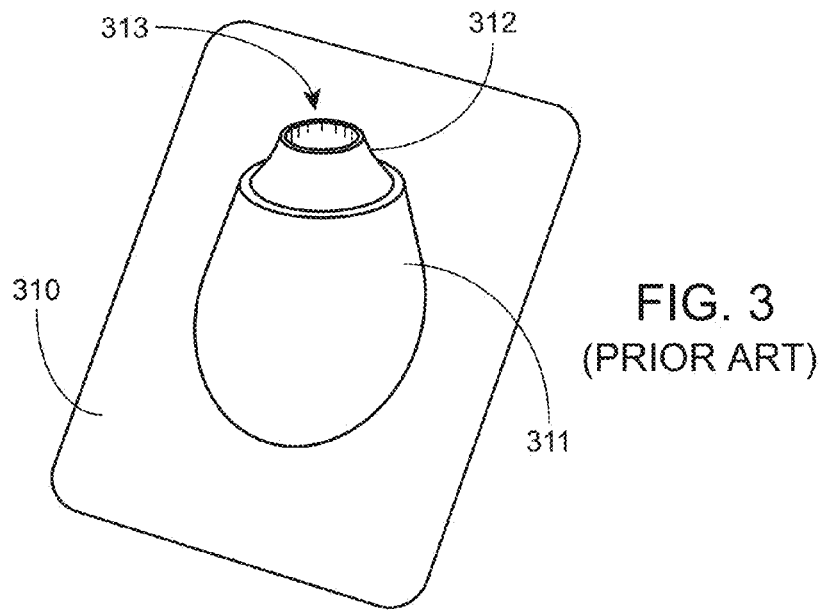
Figure 4:
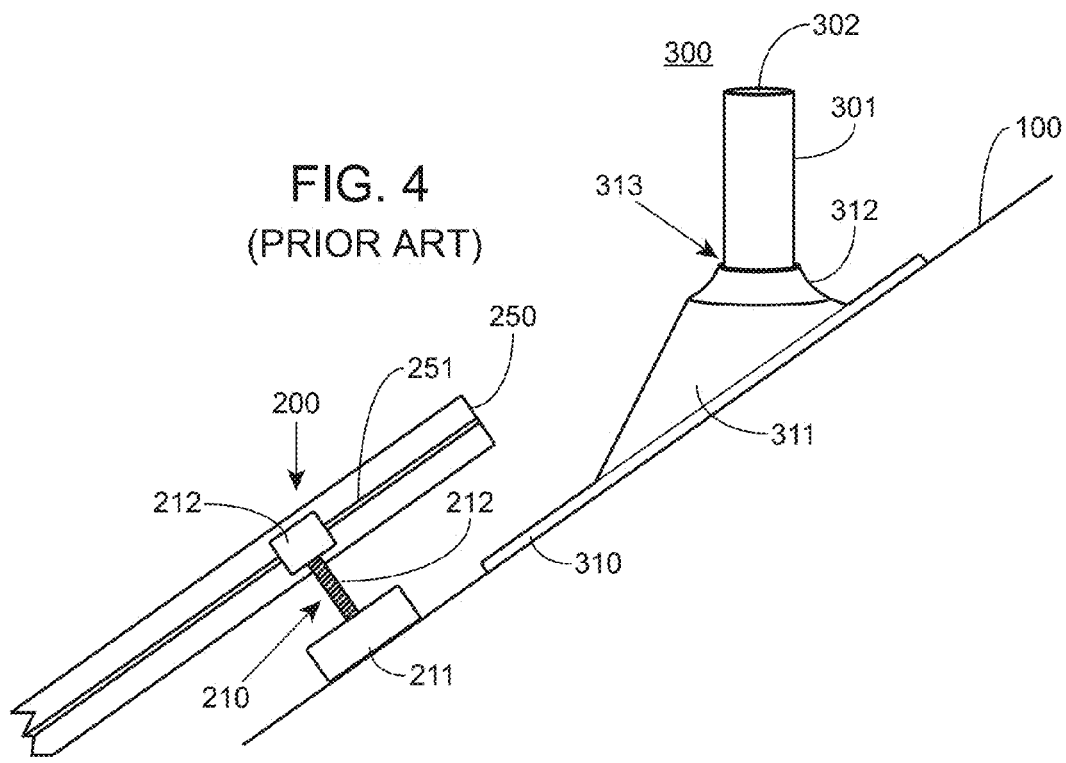
FIG. 4 shows a side view of a roof-mounted photovoltaic system adjacent a conventional roof exhaust vent according to the prior art.
Figure 12:
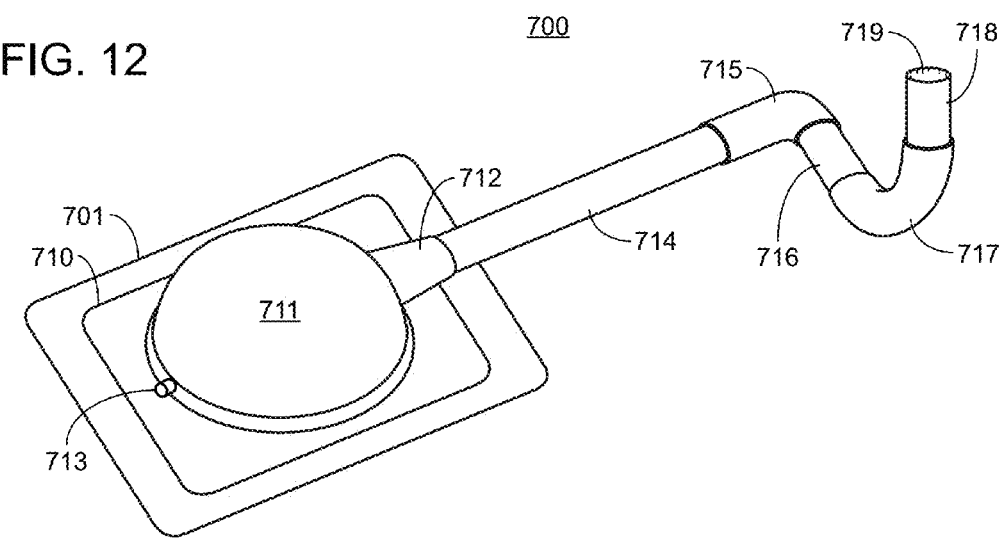

FIG. 12 shows an exemplary sewer gas exhaust vent assembly for roof-mounted photovoltaic systems according to various embodiments of the invention. Assembly 700 can include flashing cap 710 with integral housing 711. In various embodiments, flashing cap 710 can simply fit over existing flashing 701 after a sewer gas exhaust pipe, such as pipe 301 shown in FIGS. 2 and 4, is cut down at or near to flush with flashing 310 and/or collar 312. Alternatively, it may simply replace it. In various embodiments, housing 711 of the flashing cap 710 will be dome-shaped as shown in FIG. 5. In other embodiments, housing 711 may be trapezoidal, triangular or other shape that preferably, although not necessarily, deflects rain water running down a sloped roof such as roof 100 shown in FIGS. 2 and 4 and yet is tall enough to accommodate a vent pipe stub and any protrusion present in an existing flashing.

Assembly 700 may also include gasket outlet 712 that points in the up-roof direction when installed over an exhaust vent. Housing 711 is generally hollow to allow exhaust gas exiting pipe 301 to vent unimpeded into outlet 712 and also to allow equalizing air to flow back down pipe 301 to equalize pressure in the pipe, for example, after a toilet is flushed. In various embodiments, flashing cap 710 can fit over existing flashing 701 using an adhesive, nails, screws or other known attachment mechanism. In various embodiments, housing 711 and/or flashing cap 710 may also include drain hole 713 to allow any water that enters housing 711 to drain out. For example, drain hole 713 may be located on the opposite side of housing 711 from the outlet, pointing in the down-roof direction, so that gravity will cause water to run out of housing 711. Housing 711 may alternatively include a flexible elbow or other structure concealed within housing 711 that fits over the end of an existing vent pipe after it has been cut down and is connected directly to outlet 712.

Outlet 712 may include, for example, a 2" rubber gasket designed to receive a 2" extension pipe, such as pipe 714, with a friction fit with or without assistance from a hose clamp. Alternatively, outlet 712 may be composed of PVC or other rigid or semi-rigid material requiring a pipe cement seal between the outlet 712 and extension pipe 714. Next, in the assembly 700 shown in the exemplary embodiment of FIG. 5, is section of extension pipe 714. In various embodiments this pipe will be a standard 2" PVC pipe. In other embodiments, however, extension pipe 714 may include a flexible or semi-flexible hose of 2" or different dimensions. In various embodiments, the length of extension pipe 714 will depend on how much extension is required to traverse the distance from outlet 712 to the far side of the last up-roof panel at the top of the array to allow the vent extension to run far enough up the roof to clear the desired panel array placement.

Although in FIG. 12, only a single section of extension pipe 714 is illustrated extension 714 may actually include of a number of individual pipe sections that are coupled together. In various embodiments, the last section of extension pipe 714 will terminate into an elbow such as 90-degree elbow 715 in FIG. 12. That elbow may be connected to second elbow 717 via a section of connecting pipe 716 or some other coupling device. In various embodiments the use of two elbows will permit the terminus of the extension to rotate through a large range of angles with respect to a roof underneath the array to allow assembly 700 to work with roofs of different pitches. Finally, section of pipe 718 may be attached to second elbow 717 with a friction fit, hose clamp or other adhesive, allowing gas to vent through opening 719 and also equalizing air pressure in the plumbing stack. In various embodiments, section of pipe 718 may consist of a section of pipe that was cut off of the original exhaust gas vent. Otherwise, if the diameter of the original exhaust gas vent is not the same as elbow 717 (e.g., 2"), a new section of pipe may be used.

Figure 13:
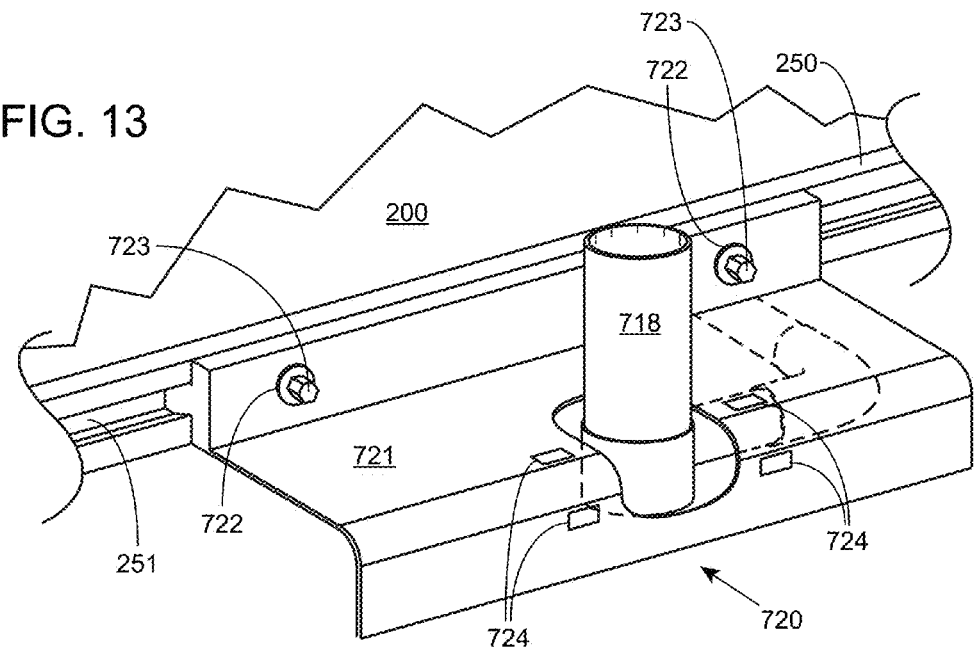

FIG. 13 shows an embodiment of mounting bracket 720 for exhaust gas vent assembly 700. Exemplary mounting bracket 720 is a tri-folded piece of sheet metal or other material that includes an opening through which section of exhaust pipe 718 can fit. In various embodiments, the opening will be large enough to accommodate a pipe positioned at a range of angles with respect to normal surface 721. Bracket 720 may also include pair of openings 722 that allows connector 723 to pass through to attach bracket 720 to frame 250 of photovoltaic panel 200. In the embodiment shown in FIG. 13, connector 723 is a Zep connector adapted to fit in a proprietary groove 251 in frame 250 of module 200, such as that discussed in U.S. patent application Ser. No. 14/190,997 and Publication No. 2014/0246549, which is hereby incorporated by reference in its entirety. In various other embodiments, different connectors may be used to attach bracket 720 to a photovoltaic module. For example, in some embodiments, bracket 720 may include an integral wrap-around type connector adapted to fit on the frame of a standard photovoltaic panel that does not have a proprietary groove, or in some cases, does not even have a frame. In various embodiments, bracket 720 also includes at least one pair of holes 724 to allow a hose clamp, cable tie or other device (not shown) to pass through bracket 720 and to wrap around second elbow 717 or extension 716 to restrain the extension assembly against bracket 721. It should be appreciated that the particular dimensions depicted in FIG. 13 are not to scale. The bracket used with the various embodiments of the invention may take on different dimensions than those shown in FIG. 13.

FIG. 14 is yet another cut away drawing illustrating another exemplary exhaust gas vent assembly according to various embodiments of the invention. The assembly shown in FIG. 14 includes substantially the same components as that depicted in FIG. 13. A portion of module 200 has been removed in the drawing figure in a cut-away manner to illustrate the location of flashing cap 710 and housing 711 under the panel. For ease of illustration, in FIG. 14, flashing cap 710 is under the same module 200 on which the bracket 721 is attached. In practical application it may be necessary for the assembly to pass under two or more photovoltaic modules in order to clear the array moving along the up-roof direction. In such applications, it may be necessary to provide an interim attachment mechanism to attach a section of extension pipe 714 as it passes under each module to improve stability, prevent sagging and resistance to wind.

To that end, FIG. 15 shows pipe clip 800 according to various exemplary embodiments of the invention for attaching section of extension pipe 714 to the frame of a solar module. Clip 800 can include lower hanger portion 801 and upper mounting portion 805. Lower hanger portion 801 can include a hook having generally smooth, tubular-shaped interior 802 dimensioned to wrap around the outer surface of a portion of an extension pipe. For example, pipe 714 in the preceding figures can elevate the pipe above a roof surface and prevent sagging. In various embodiments, lower hanger portion 801 may also include spine portion 803 designed to increase the strength and resiliency of lower hanger portion 802 when it is bent open to accommodate a section of extension pipe.

Upper mounting portion 805 may include, for example, a single lower support or a pair of lower supports such as supports 804 as well as one or more upper supports 806. In various embodiments, when clip 800 is attached to a photovoltaic module, lower supports 804 can fit underneath the outer frame of the module while the upper support 806 fits in a groove of a module frame, thereby retaining clip 800 to the frame. FIG. 15A illustrates such a clip holding section of extension pipe 714 and attached to frame 250 of a PV module. The frame can include extrusion 250 with groove 251. Upper support 806 has a downward sloped flange surface that fits on a lower surface of groove 251 such that the weight of the pipe 714 tends to keep upper support 806 down into groove 251 as well as the top of the pipe pushing up against the bottom of upper portion 805 from underneath. In various embodiments, it may be necessary to angle lower hanger portion 801 up in order to pivot upper support 806 into the groove 251 and lower support 804 under the bottom of frame 250 before extension pipe 714 is attached to lower hanger 801.

Figure 16:
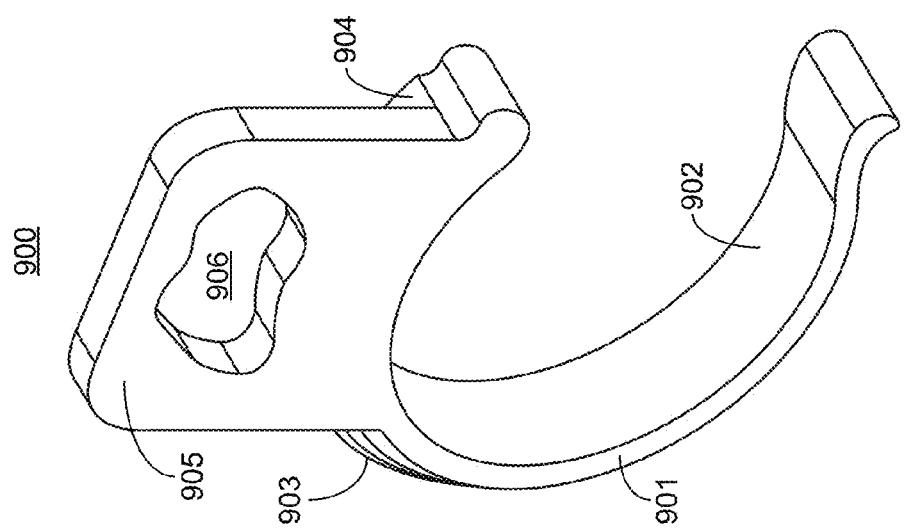

FIG. 16 shows exemplary pipe clip 900 according to another embodiment of the invention. Lower hanger portion 901 of clip 900 is substantially identical to lower hanger portion 801 of clip 800. It includes smooth, curved inside surface 902 that rests against an outer surface of an extension pipe, and strengthening rib 903. Upper portion 905 can also include one or more lower supports 904 that fit under the frame of a photovoltaic module when the clip is mounted to the module. Upper portion 905 differs from upper mounting portion 805 of the clip 800 in FIG. 15 in that instead of having upper support 806, upper portion 905 has opening 906 that allows a connector to pass through to attach clip 900 to frame 250 of a photovoltaic panel. In the embodiment depicted in FIG. 16, the shape is specifically designed to accommodate a rotating Zep coupler as discussed herein. However, in various other embodiments, the opening may be substantially round, square, or any other shape that allows a specific connector to pass through the upper portion, either to or from the frame of a photovoltaic panel.

Figure 17:
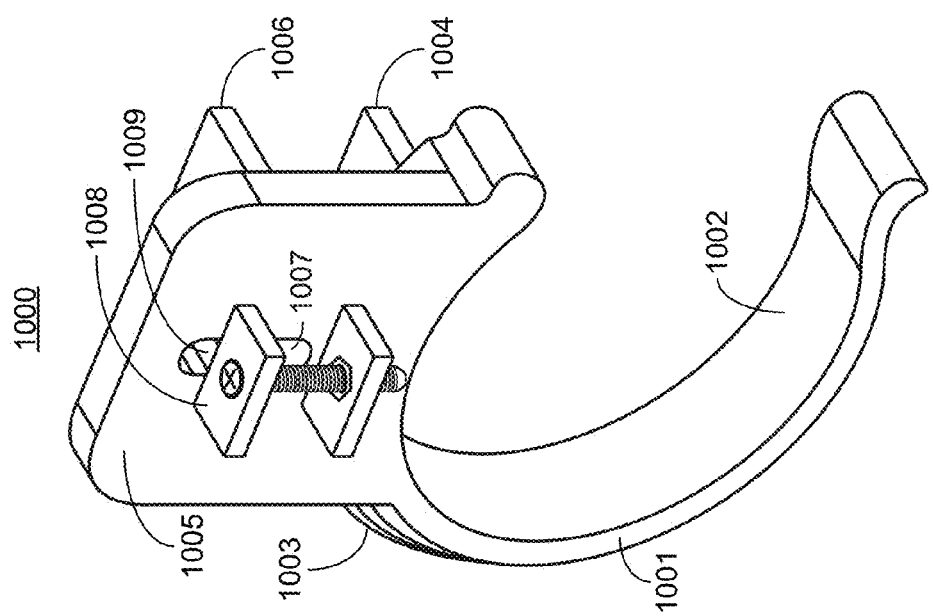

FIG. 17 illustrates exemplary pipe clip 1000 according to yet another embodiment of the invention. Pipe clip 1000 may be specifically designed to work with panels that are grooveless and/or frameless. Again, lower hanger portion 1001 is substantially the same as that of clips 800 and 900, shown in FIGS. 15 and 16 respectively, including smooth, curved inside surface 1002 that rests against a surface of an extension pipe, and strengthening rib 1003. Upper mounting portion 1005 includes lower support 1004 that is fixed with respect to upper mounting portion 1005, and movable upper support 1006 that can be moved up or down with respect to fixed lower mounting portion 1004. Upward and downward movement is made possible by tab 1008 that passes through slot 1007 cut into upper portion 1005 via arm 1009. In various embodiments, channel 1007 is dimensioned such that upper support portion 1006 can be rotated 90 degrees so that tab 1008 can pass through slot 1007 before rotating upper support 1006 back to its normal position above lower support 1004. The upper portion according to this embodiment may also include fixed tab 1011 with integral nut 1012 that receives threaded machine screw 1010 that moves tab 1009 with respect to fixed tab 1011 thereby lifting or lowering upper support 1006 with respect to lower support 1004 by rotation of screw 1010. In this manner, upper support 1006 and lower support 1004 can clamp around the frame of a grooveless photovoltaic panel or grab the edge of a frameless photovoltaic panel.

Figure 18:
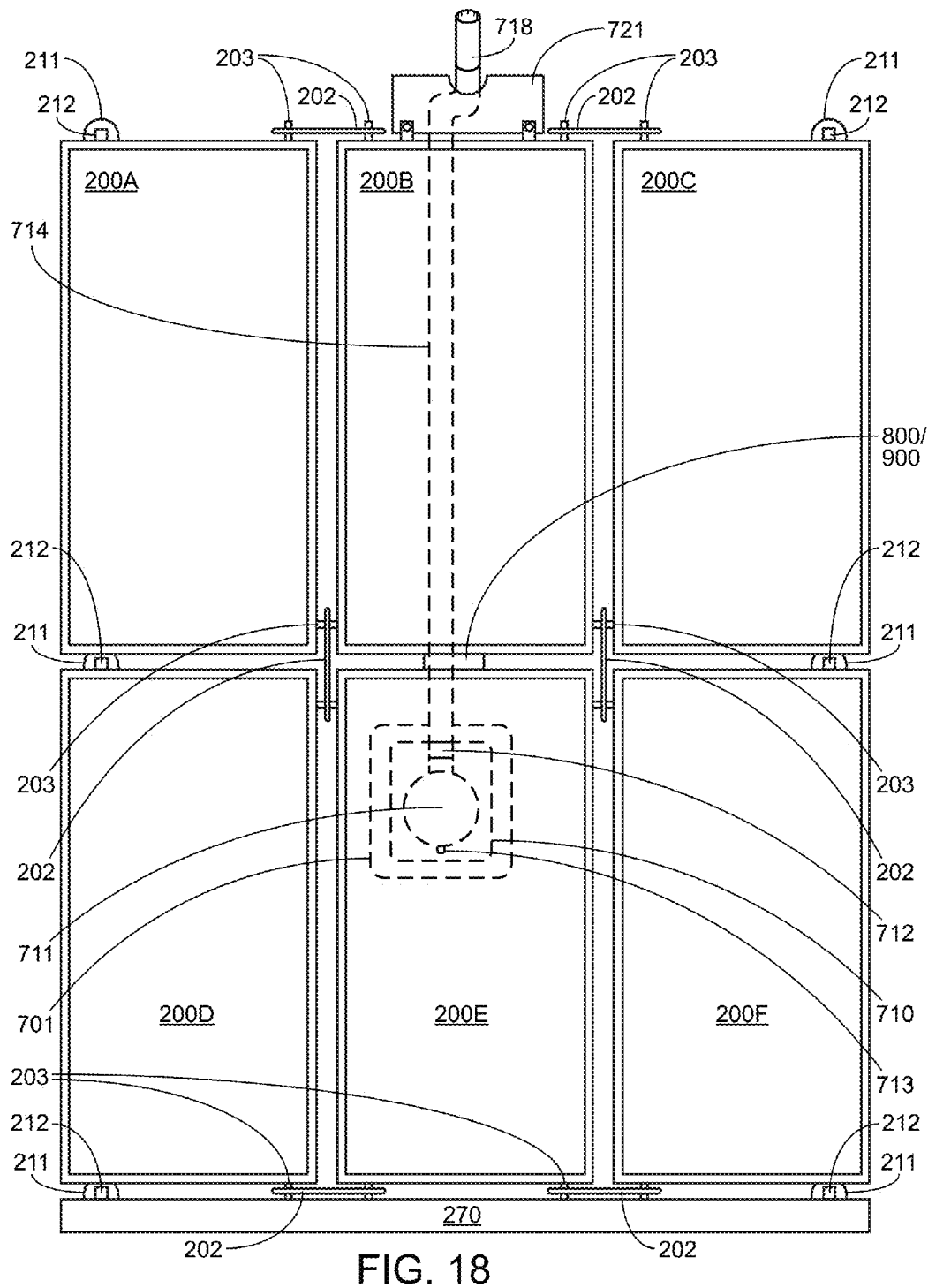
FIG. 18 shows an overview of an example exhaust gas cap vent assemblies with extension piping in accordance with some embodiments.

Referring now to FIG. 18, this figure illustrates an exemplary array of interconnected, roof-mounted photovoltaic panels 200A-200F with an exhaust gas panel vent extension according to various embodiments of the invention. Panels 200A-200F comprising the six panel array of FIG. 18 are connected to one another using interconnect plates 202 and rotating locking connectors 203, and are connected to the roof surface with mounting pucks 211, adjustable leveling screws (not shown), and male groove connectors 212. The array also includes array skirt 270 spanning the left to right direction along the down-roof edge of the array. It should be appreciated, however, that in various other embodiments, the panels may have grooveless frames or may be manufactured without frames. In such embodiments, different types of connectors may be used to interconnect modules and to mount the interconnected modules to a roof surface.

In the array depicted in FIG. 18, there is a sewer gas exhaust vent located underneath one of the panels that, but for the present invention, would have prevented panel 200E from being installed over that point. In this case, the existing vent has been cut down and flashing cap 710 has been placed over the vent pipe and existing flashing. Flashing cap 710 includes dome-shaped housing 711 with outlet 712. Flashing cap 710 and housing 711 have been mounted so that outlet 712 generally points in the up-roof direction. A pipe hanger, such as pipe hanger 800 or 900 shown in FIGS. 15 and 16 respectively may be mounted on the up-roof frame portion of panel 200E to support extension pipe 714. Alternatively, it may be mounted on the down-roof frame portion of next panel 200B. Extension pipe 714 may run all the way up under panel 200B to the top edge, where it joins with elbow portions 715 and 717 to pass through bracket 720, ultimately terminating in pipe section 718. As discussed herein, bracket 720 may be attached to panel 200B using a Zep style connector if the frame of panel 200B contains a reciprocal groove. Otherwise, if the frame of panel 200B is a grooveless frame, or, if the panel is a frameless panel, bracket 720 may be attached using a different type of connector such as a clamping connector, or attached directly with screws or other fasteners.

Figure 19:
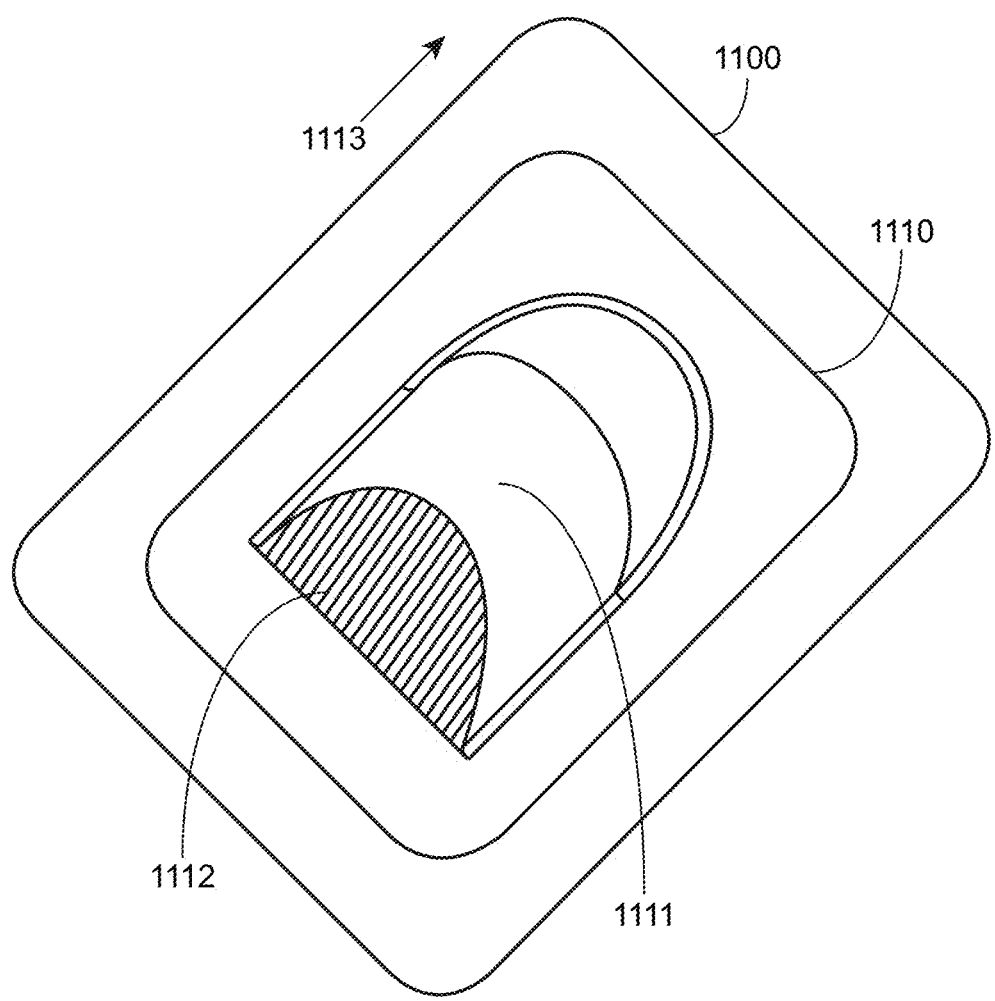
FIG. 19 shows an alternative example exhaust gas cap vent assembly that does not require use of extension piping in accordance with some embodiments.

FIG. 19 shows an exemplary flashing cap according to yet another embodiment of the invention. Flashing cap 1110 may be particularly useful in jurisdictions that don't require that the sewer gas exhaust vent be extended all the way up the roof and protrude six or more inches above the roof surface. As with flashing cap 710 depicted in other Figures, flashing cap 1110 is designed to fit over existing flashing 1100 after the sewer gas exhaust vent pipe has been cut down. Alternatively, it may simply replace it. Unlike flashing cap 710 of other embodiments, flashing cap 1110 does not have an up-roof outlet for attaching a section of extension pipe. Instead, this flashing cap includes housing 1111 with screened opening 1112 that is designed to face down roof. Housing 1111 may also conceal a Studor valve or other airflow controlling device. Housing 1111 may have a generally dome-like or rounded shape to deflect water running down the roof. Also, screened opening 1112 may face down roof (i.e., in the opposite direction to arrow 1113) so that water, leaves, and other debris do not naturally slide down the roof and block the screened opening 1112 thereby obstructing the flow of air and gas into and out of opening 1112. Flashing cap 1110 may be attached over flashing 1100 using any of the known methods discussed herein.

Figure 20A:
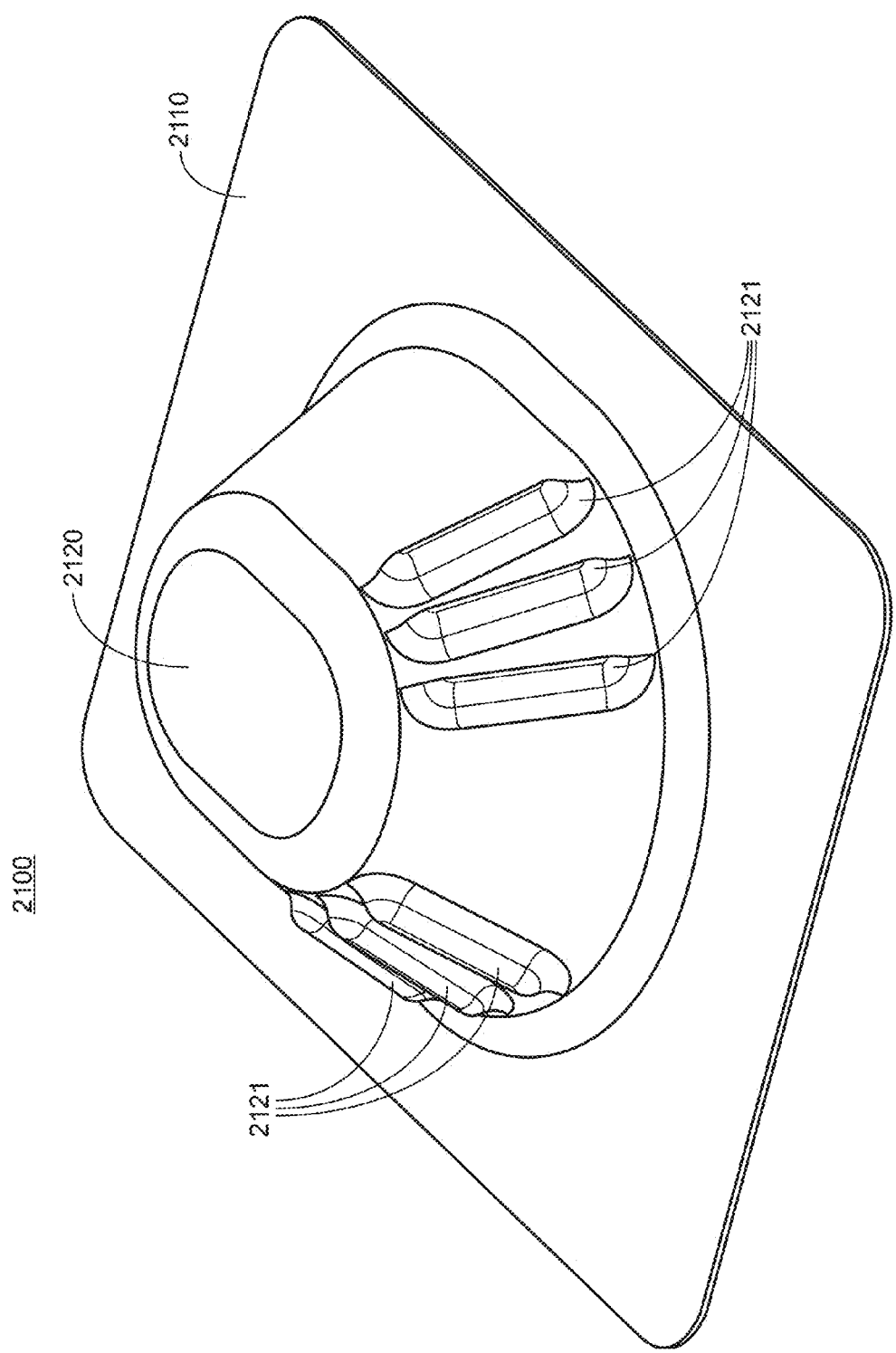
FIGS. 20A-C, 21 and 22 show several views of example exhaust gas cap vent assemblies that do not require use of extension piping in accordance with some embodiments.
Figure 20B:
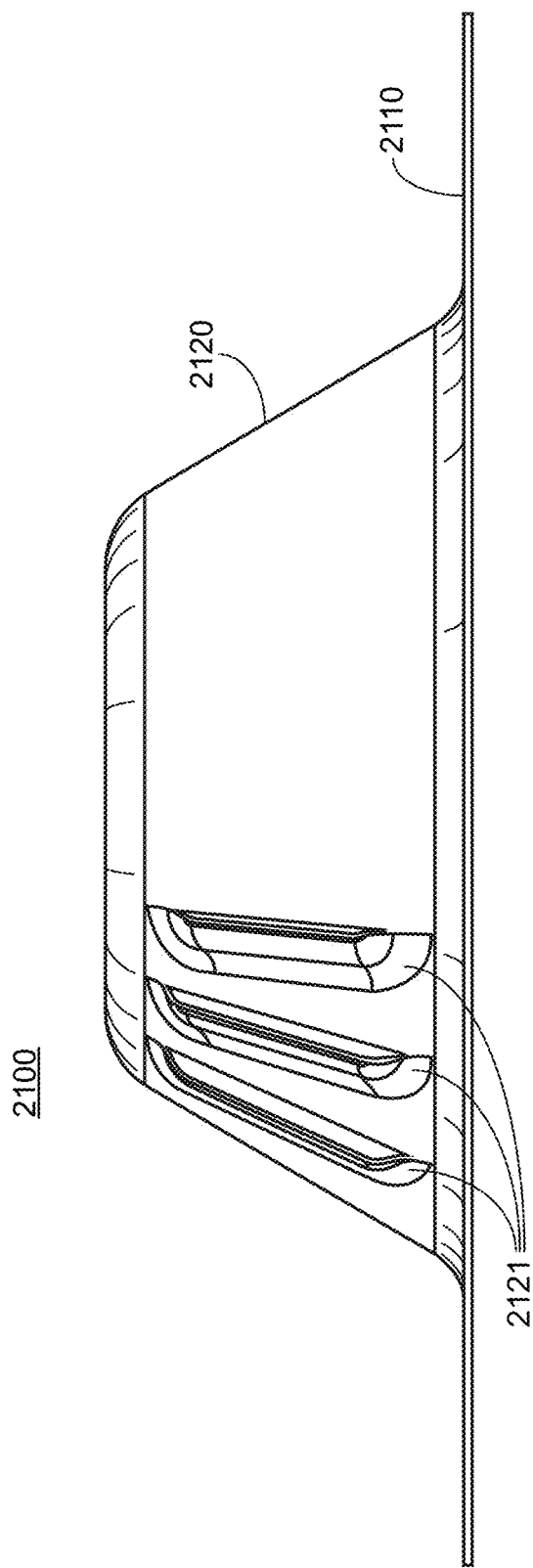
Figure 20C:
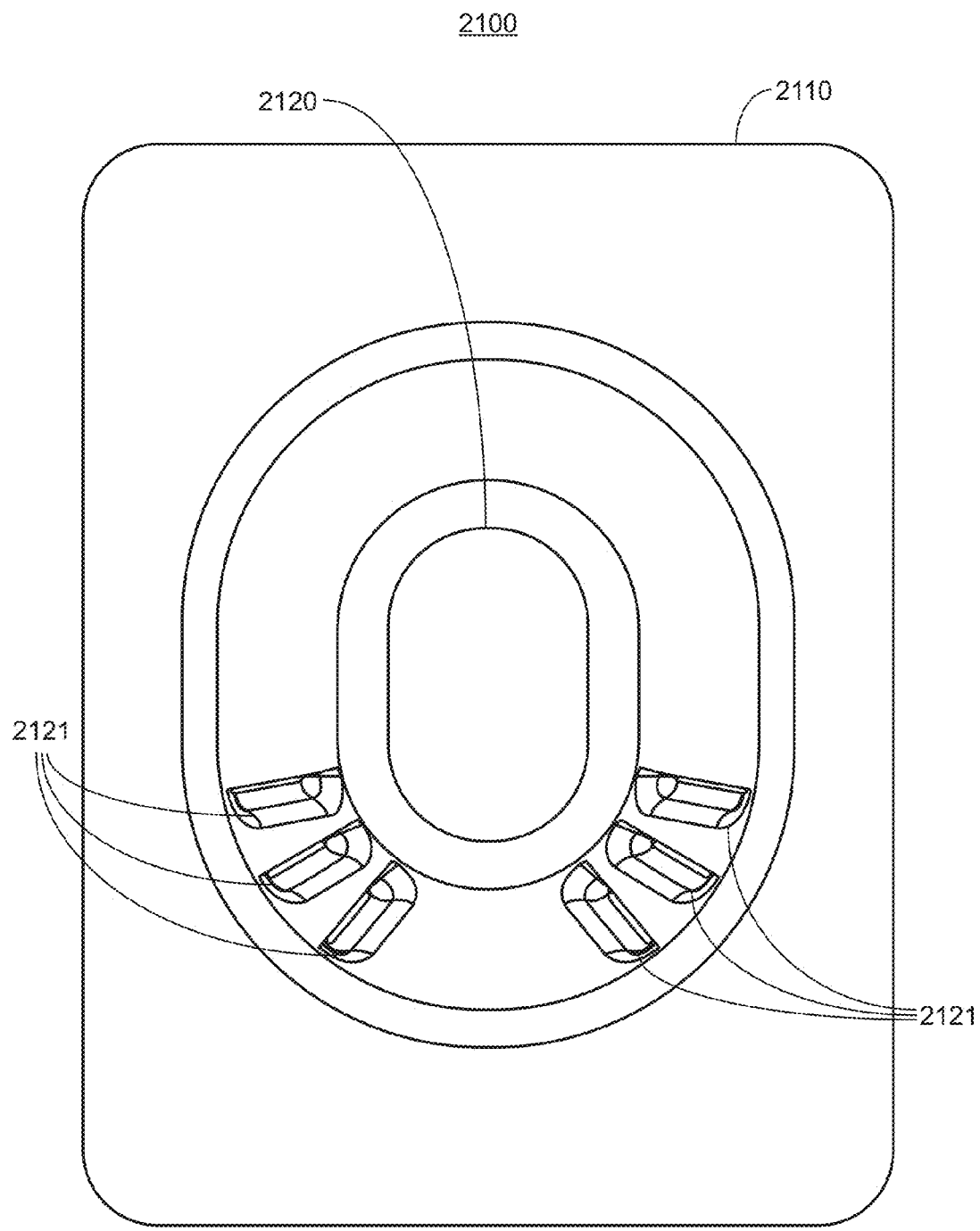
Figure 21:
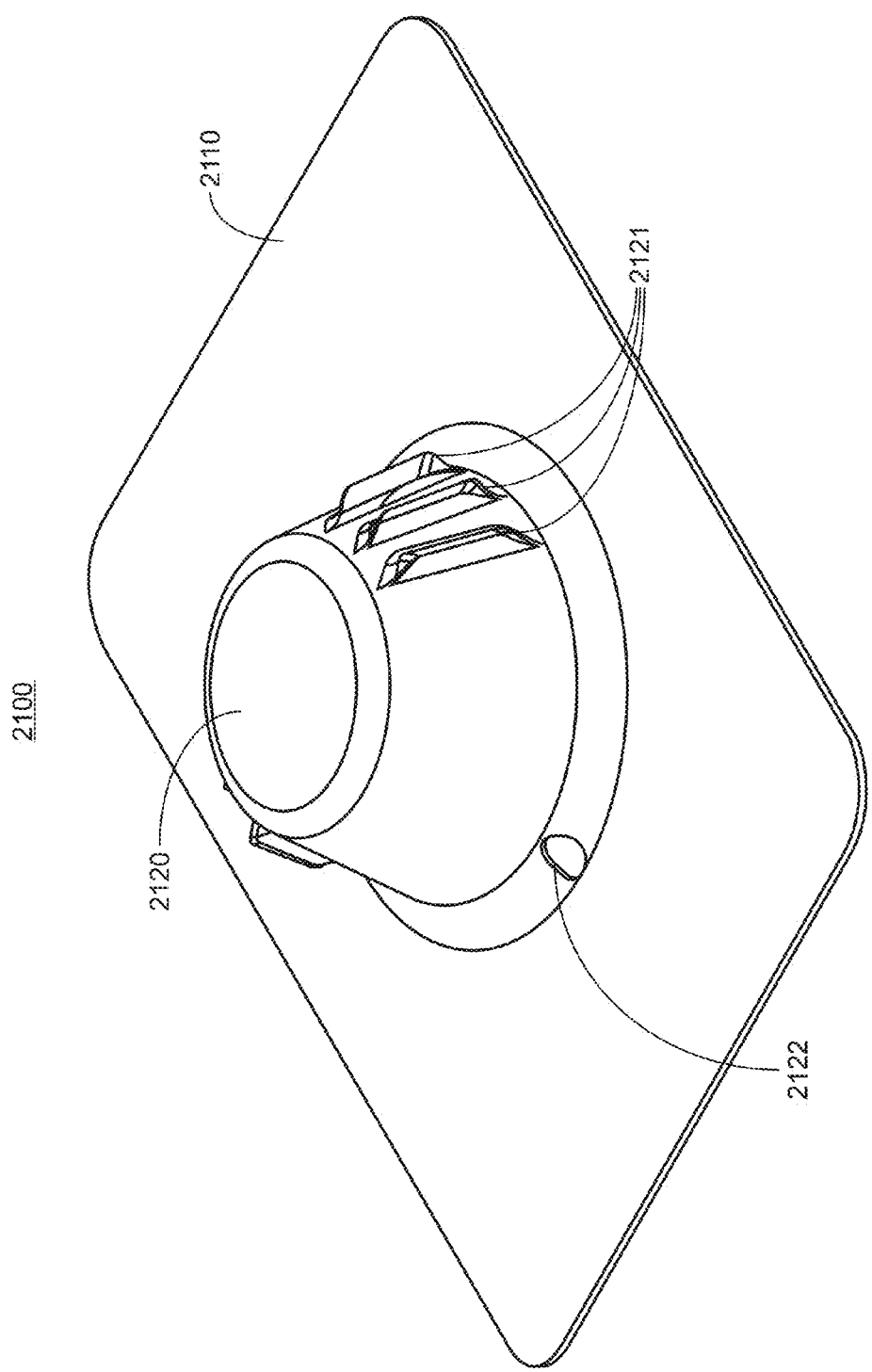

Turning now to FIGS. 20A-21, these figures illustrate an exemplary flashing cap according to other embodiments of the invention. Like flashing cap 1110, depicted in FIG. 19, flashing cap 2100 does not require rerouting the exhaust gas vent. Instead, the flashing cap 2100 is intended to fit over an existing sewer gas exhaust vent after the vent has been cut down, near, at, or below an existing boot.

As illustrated in the exemplary embodiment of FIG. 20A, cap 2100 can include substantially planar flashing portion 2110 made of sheet metal, plastic, or other suitable weather and UV resistant material. Cap 2100 may also include hood portion 2120, which may be stamped into flashing portion 2110 so that both may be formed form a single sheet of material. In various other embodiments, hood portion 2120 may be formed separately and attached to flashing portion 2110 using a weld, adhesive, or other suitable bonding mechanism. If hood portion 2120 is formed separately, flashing portion 2110 may contain a hole or opening formed in substantially the center of the flashing portion 2110 so that hood portion 2120 can be attached to cover up the hole, thereby creating a single structure adapted to accommodate an existing sewer gas exhaust vent. In various embodiments, hood portion 2120 can extend a distance above substantially planar flashing portion 2110 within a range from 1" to 6" to accommodate any vent piping while still allowing for standard installation of a solar panel over the venting area. Substantially planar flashing portion can be rectangular or any other shape that can interleave or overlap with shingles of the roof surface.

As seen in FIGS. 20A-22, hood portion 2120 may be an oval. Alternatively, hood portion 2120 may be circular as shown in FIG. 21. Other shapes may be used as well. Also, even though cap 2100 may include flashing portion 2110, it may be installed directly over an existing vent pipe flashing as illustrated in FIG. 19. In such cases, it may be necessary to cut away a portion of flashing 2110 on the up-roof side depending on whether or not there shingle nails are present in the up-roof shingles. Alternatively, it may be desirable to remove the existing flashing and completely replace it with cap 2100.

As shown in FIGS. 20A-22, hood portion 2120 may also include one or more vents 2121. Vents 2121 allow sewer exhaust gas to exit cap 2100 and also for air to flow back in to regulate pressure in the sewer stack. In various embodiments, it may be desirable for the openings to be covered in the up-roof direction and to face substantially down-roof so that downward flowing water does not enter hood portion 2120. In various embodiments, the vent openings are elongated slots that are arranged in a transverse direction from the roof surface when the cap flashing is mounted on the roof. The hood portion may include a top surface and one or more side surfaces depending on the overall shape of the hood portion. Typically, the vent openings are disposed on a side surface of the hood portion so as to face down-roof. In some embodiments, the vent openings are a series of louvered openings with the louvers or fins angled in a down-roof direction to further inhibit flow of downward flowing water into the hood portion. The vent openings may be spaced away from an uppermost portion of the side surface where contact with run-off would generally occur. In various embodiments, it may be desirable to make the area of the vent openings equivalent or greater than the dimensions of a typical exhaust vent pipe opening so that the airflow rate is not substantially reduced. Also, although not shown, the vent openings may in various embodiments be covered with a screen on the inside to discourage bugs from entering or residing in hood portion 2110.

Referring to FIG. 21, either flashing portion 2110 or hood portion 2120 may include one or more weep holes 2122 to allow any water that does enter hood portion 2120 to escape. In various embodiments it may be desirable to orient cap 2100 so that weep hole 2122 is pointing down-roof to further encourage the egress of water out of cap 2100 under the assistance of gravity.

Figure 22:
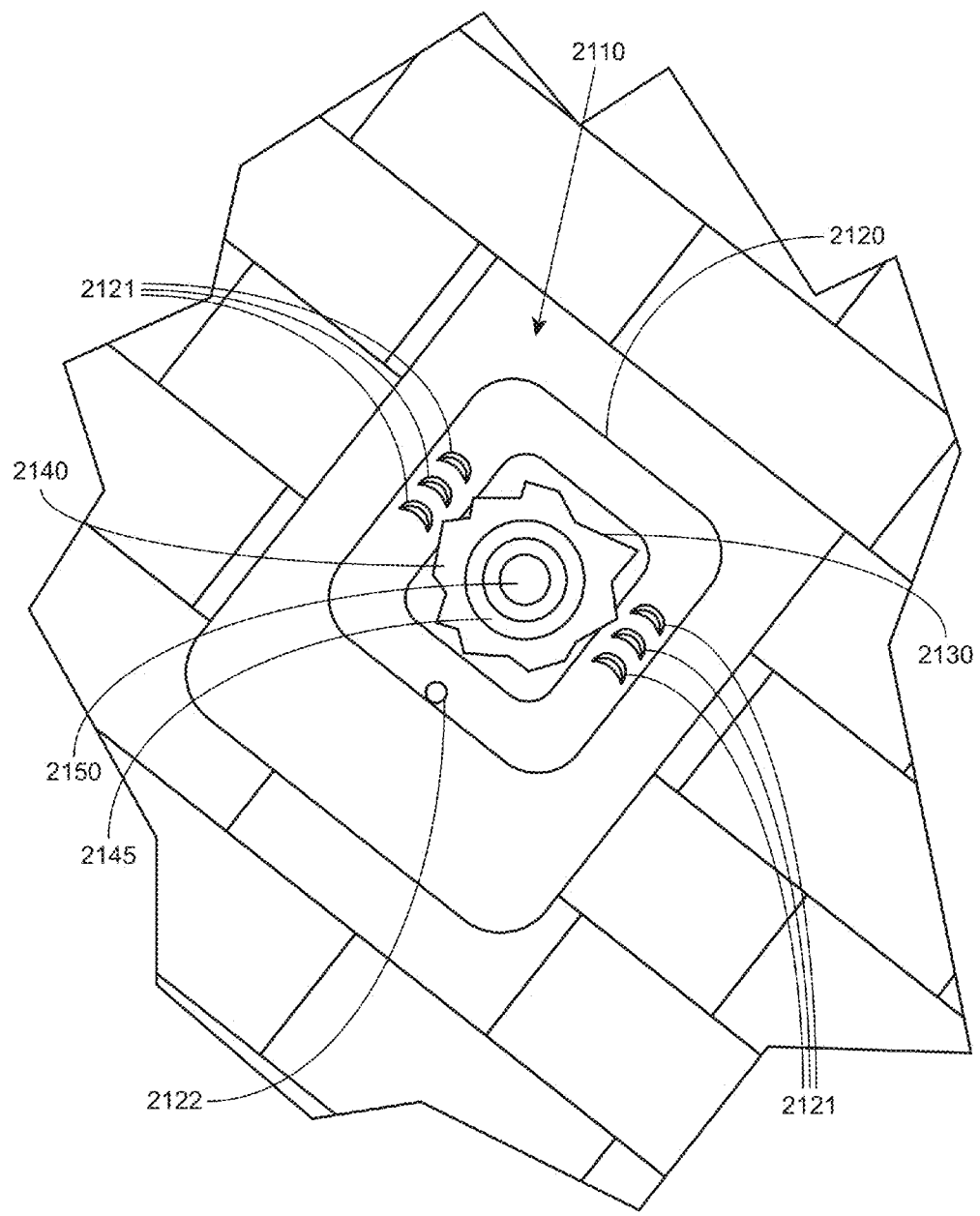

FIG. 22 is a partial cut-away view of sewer gas exhaust vent replacement cap 2100 after it has been installed onto an existing shingle roof. As shown, cap 2100 can be roughly centered about existing exhaust pipe opening 2150 seen under the cutaway. In various embodiments, when cap 2100 is installed, an installer will first cut down existing pipe 2150 so that it is flush with boot 2145 or, alternatively, in some cases, the boot may be completely removed and replaced with a smaller, lower profile boot (not shown) to allow hood portion 2120 to fit over pipe 2150.

In this exemplary drawing figure, original flashing 2140 can also be seen under the cutaway. However, as noted above, in various embodiments, original flashing 2140 and boot may be removed and discarded, and replaced with cap 2100. In various embodiments, it may be necessary and/or required by code to place a lower profile boot over the exposed vent portion so as to maintain a seal that will prevent exhaust gas from flowing back into space below the roof.

In another aspect, the replacement flashing may include a raised portion that allows sufficient clearance for any residual flashing from the original flashing and/or collar being replaced and/or any roofing debris attached to the roof adjacent the exhaust vent pipe. Such residual debris can include but are not limited to sealing materials, such as roofing tar or putty, that are commonly applied to the roof where an exhaust pipe protrudes through the roof. In some circumstances, it may be difficult or undesirable to entirely remove an existing flashing or associated debris. For example, an existing flashing may be attached to existing roofing materials with adhesive or tar such that removal of the flashing may require removal of surrounding roofing materials. Furthermore, it is not feasible to let the flashing remain and cut-off a portion of the exhaust pipe since the original flashing itself may protrude from the roof a greater distance than desired or limit access to the vent pipe.

Figure 23:
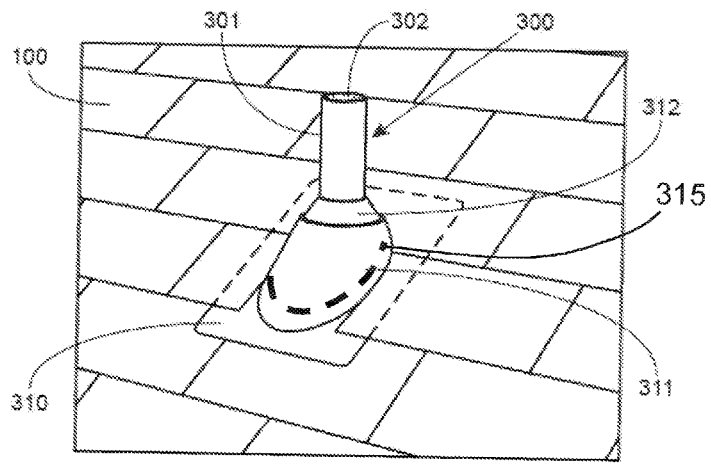
FIG. 23 shows a cut-line on a conventional roof exhaust vent flashing for modification of the vent in accordance with some embodiments.
Figure 24:
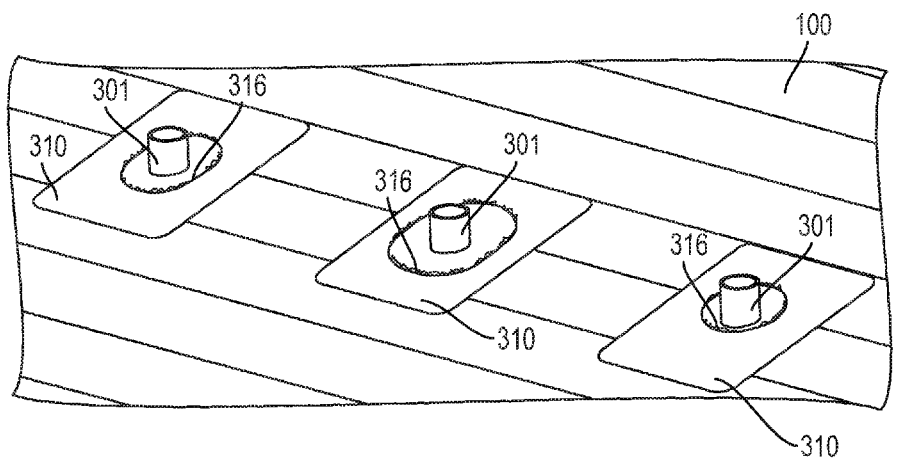
FIG. 24 shows three conventional roof exhaust vent flashings that have been cut-off for modification of the vent in accordance with some embodiments.

As seen in the example of FIG. 2, some conventional flashing includes a raised conical portion 311 that extends a substantial distance above the roof. In such cases, it may be desirable to cut away a portion of the existing flashing that extends above the roof, while allowing a planar portion of the original flashing to remain. Removal of this portion of the existing flashing may also allow more of the exhaust vent pipe to be cut-off. As shown in FIG. 23, the existing flashing can be cut off along a cut-line 315, as determined by the installer, that removes the portion of the flashing that extends a distance further from the roof than desired to provide the necessary clearance to the solar panel or to allow more of the vent pipe to be removed. One difficulty presented by this approach is that removal of a portion of the existing flashing can leave an uneven roof surface as residual flashing 316 may extend a slight distance above the roof, as can be seen in the three examples shown in FIG. 24.

Figure 25:
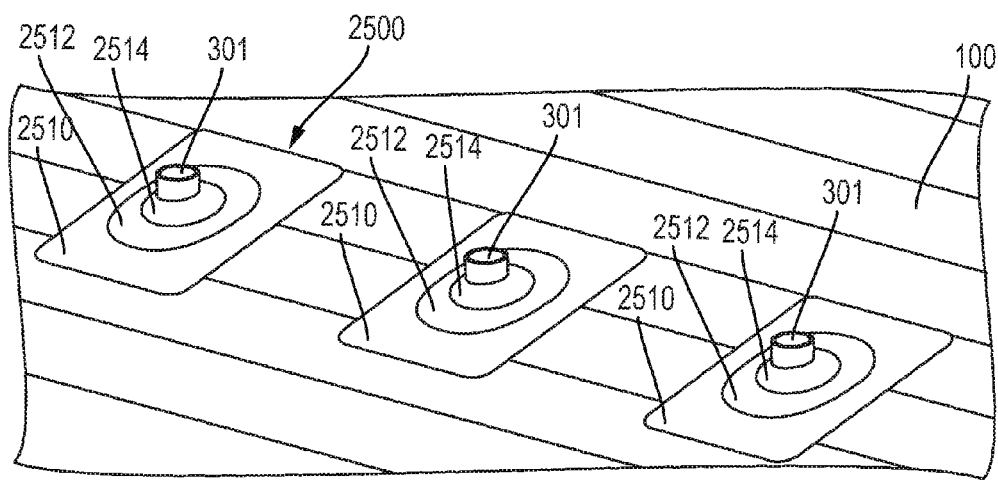
FIG. 25 shows a replacement flashing with a raised portion that accommodates the residual flashings shown in FIG. 24 in accordance with some embodiments.

In removing a portion of the existing flashing, it is often not feasible to cut off the portion to be removed entirely flush with the roof. Therefore, it is desirable for any replacement flashing to include a raised portion in the substantially planar portion of the flashing that accommodates any residual flashing and/or roofing debris adjacent the exhaust vent pipe. In the embodiment of FIG. 25, replacement flashing 2500 includes raised portion 2512 that is circumscribed by substantially flat planar flashing portion 2510, which is suited for placement against the roof surface or against a planar portion of the existing flashing. In one aspect, raised portion 2512 extends a substantial distance toward the outside edge (e.g. within one to 6 inches of the edge) so as to accommodate residual flashings of varying dimensions. For example, as shown in FIG. 25, raised portion 2512 is wide and tall enough that a replacement flashing of the same dimensions accommodates each of the three different residual flashings shown in FIG. 24. In some embodiments, the raised portion is integral with the substantially planar flashing portion, for example, the raised interior portion may be stamped into the sheet metal defining the planar flashing portion. The interior portion can also be formed separately and joined to the planar flashing portion. In the embodiment of FIG. 25, replacement flashing raised portion may include rubber collar 2514 to seal the vent pipe against the flashing portion.

In another aspect, any of the replacement flashings described herein can include a raised interior portion on the substantially planar flashing portion so as to accommodate any residual flashing and/or roofing debris. In some embodiments, the replacement flashing includes a raised portion and a hood portion protruding from the raised portion that accommodates the vent pipe and includes one or more vent openings therein. Such embodiments may include any of the hood portions described herein. In other embodiments, the replacement flashing includes a raised portion from which a housing protrudes so as to allow redirecting of the exhaust vent pipe in another direction through piping or flexible hose connections. In still other embodiments, the replacement flashing includes a raised portion and a gasket or collar engaged with an opening in the raised portion so as to allow sealing of the vent pipe with the gasket, the vent pipe being cut off at a suitably lower height so as to accommodate installation of a solar panel directly over the vent pipe.

Figure 26:
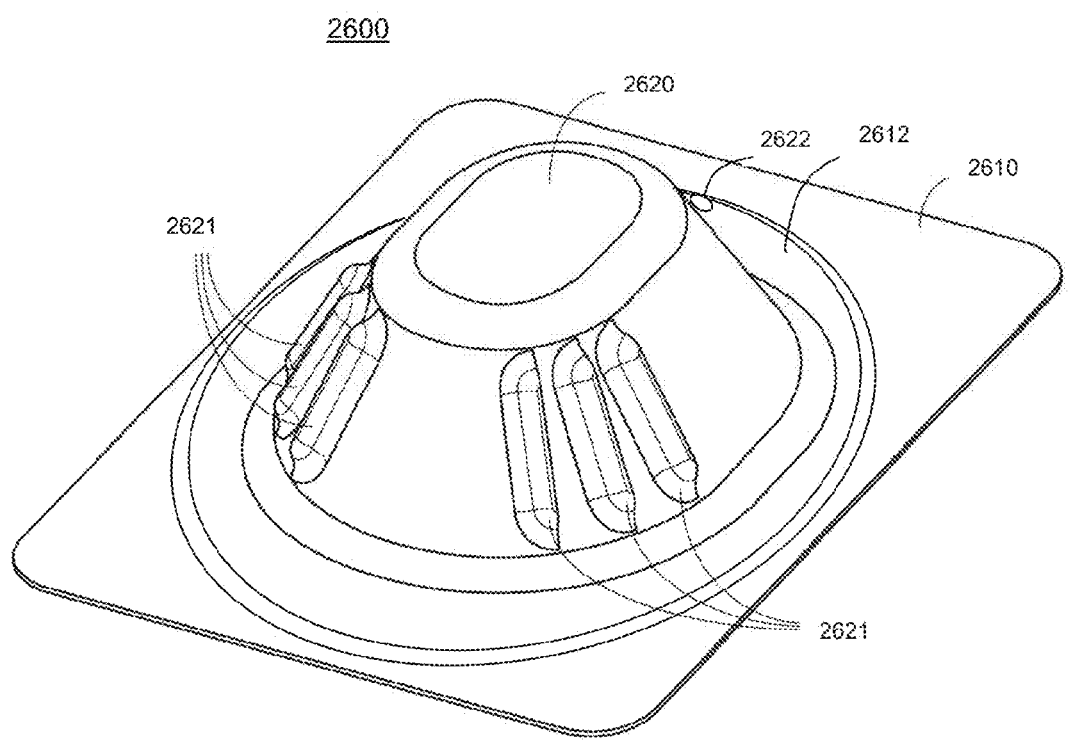
FIG. 26 shows a replacement flashing with a raised portion having a hood portion in accordance with some embodiments.

As illustrated in the exemplary embodiment of FIG. 26, replacement flashing 2600 can include substantially planar flashing portion 2110, which can be made of sheet metal, plastic, or other suitable weather and UV resistant material, that further includes raised interior portion 2612 adapted to accommodate any residual flashing or roofing debris. Replacement flashing 2600 also includes hood portion 2620, which may be stamped into the raised portion 2612 of flashing 2610 so that both may be formed form a single sheet of material or can be formed separately and attached to flashing portion 2610 using a weld, adhesive, or other suitable bonding mechanism. If hood portion 2620 is formed separately, raised portion 2612 may contain a hole or opening formed in substantially the center so that hood portion 2620 can be attached to cover up the hole, thereby creating a single structure adapted to accommodate an existing sewer gas exhaust vent. In various embodiments, hood portion 2620 can extend a distance above raised portion 2612 within a range from 1" to 6" to accommodate any vent piping while still allowing for standard installation of a solar panel over the venting area. Substantially planar flashing portion 2610 can be rectangular or any other shape that can interleave or overlap with shingles of the roof surface, while raised portion 2612 can be oval or pill-shaped to match a shape of the hood portion 2620 or any shape desired. In one aspect, the raised portion 2612 includes one or more weep holes 2622 to allow any water that does enter hood portion 2620 and raised portion 2612 to escape. It is desirable to orient replacement flashing 2600 so that weep hole 2622 is pointing down-roof to further encourage the egress of water out of replacement flashing 2600 under the assistance of gravity.

In yet another aspect, the replacement flashing can include a housing or hood portion that is suitably enlarged and/or extended along the substantially planar flashing portion so as to accommodate any residual flashing and/or roofing debris.

The embodiments of the present inventions should not be limited in scope by the embodiments described herein. For example, although many of the embodiments have been described with reference to shingle roofs, the principles herein are equally applicable to other types of roofs such as tile roofs. Indeed, various modifications of the embodiments of the present inventions, in addition to those described herein, will be apparent to those of ordinary skill in the art from the foregoing description and accompanying drawings and claims. Thus, such modifications are intended to fall within the scope of this invention. Further, although some of the embodiments of the present invention have been described herein in the context of a particular implementation in a particular environment for a particular purpose, those of ordinary skill in the art will recognize that its usefulness is not limited thereto and that the embodiments of the present inventions can be beneficially implemented in any number of environments for any number of purposes. Accordingly, this disclosure should be construed in view of the full breath and spirit of the embodiments disclosed herein and claimed below.

What is claimed is:

1. An exhaust gas replacement flashing comprising:
a substantially planar flashing portion suitable for mounting on a sloped roof, wherein the substantially planar flashing portion circumscribes a raised interior portion of the replacement flashing, the raised interior portion protruding from the planar flashing portion a distance within a range of 0.25 inches to 6 inches to provide clearance for any residual flashing and/or roof debris protruding from the roof when mounted over a vent area of the sloped roof; and
a hood portion protruding from the raised interior portion and extending a distance above the raised interior portion within a range from 1 inch to 6 inches to accommodate a cut-down vent pipe protruding further from the roof surface than the residual flashing and/or roof debris, the hood portion having one or more vent openings adapted to permit airflow into and out of the hood portion,
wherein the one or more vent openings comprise a series of louvered openings, each having a louver angled towards a down-roof direction when the flashing is mounted on the roof.

2. The exhaust gas replacement flashing of claim 1 wherein the raised interior portion is formed in a generally oval or pill shape elongated along a slope direction of the roof when mounted thereon, wherein the raised interior portion includes a continuous sidewall surface that angles to the substantially planar portion along an entire periphery of the generally oval or pill shaped raised interior portion.

3. The exhaust gas replacement flashing of claim 1 wherein the raised interior portion protrudes from the planar flashing portion a distance between 0.25 inches and about 4 inches.

4. The exhaust gas replacement flashing of claim 1 wherein the raised interior portion protrudes from the planar flashing portion a distance between 1 inch and 4 inches.

5. The exhaust gas replacement flashing of claim 1 wherein the hood portion is circumscribed by the raised portion.

6. The exhaust gas replacement flashing of claim 1 wherein the one or more vent openings are configured to open towards a down-roof direction when the substantially planar flashing portion is mounted on the roof.

7. The exhaust gas replacement flashing of claim 6 wherein the hood portion comprises a top surface and one or more side surfaces, wherein the one or more vent openings are disposed on the one or more side surfaces.

8. The exhaust gas replacement flashing of claim 1 wherein the hood portion is formed in a generally oval or pill shape elongated along a slope direction of the roof when mounted thereon.

9. The exhaust gas replacement flashing of claim 1 wherein the hood portion is formed in a generally circular shape along a direction of the roof surface when mounted thereon.

10. The exhaust gas replacement flashing of claim 1 wherein the series of louvered openings are spaced away from an uppermost portion of the one or more side surfaces in an up-roof direction when the flashing is mounted on the roof.

11. The exhaust gas replacement flashing of claim 1 wherein the substantially planar flashing portion is of a generally rectangular shape so as to be suitable for interleaving or overlapping with one or more shingles of the roof surface when mounted thereon.

12. The exhaust gas replacement flashing of claim 1 wherein the replacement flashing is stamped from a single sheet of metal.

13. The exhaust gas replacement flashing of claim 1 wherein the hood portion and the substantially planar flashing are separate components bonded together.

* * * * *